(12) United States Patent
Ota et al.

(10) Patent No.: US 9,976,016 B2
(45) Date of Patent: May 22, 2018

(54) FLUORORUBBER COMPOSITION

(71) Applicant: DAIKIN INDUSTRIES, LTD., Kita-ku, Osaka-shi (JP)

(72) Inventors: Daisuke Ota, Settsu (JP); Shigeru Morita, Settsu (JP); Akinori Ueda, Settsu (JP); Yuu Kadowaki, Settsu (JP); Masanori Kitaichi, Settsu (JP); Michiko Doi, Settsu (JP); Kazuhiro Yamamura, Settsu (JP); Shoji Fukuoka, Settsu (JP); Mayuko Taeda, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 836 days.

(21) Appl. No.: 14/380,101

(22) PCT Filed: Feb. 22, 2013

(86) PCT No.: PCT/JP2013/055612
§ 371 (c)(1),
(2) Date: Aug. 21, 2014

(87) PCT Pub. No.: WO2013/125736
PCT Pub. Date: Aug. 29, 2013

(65) Prior Publication Data
US 2015/0017364 A1    Jan. 15, 2015

Related U.S. Application Data

(60) Provisional application No. 61/602,862, filed on Feb. 24, 2012.

(51) Int. Cl.
| | | |
|---|---|---|
| *C08L 15/02* | (2006.01) | |
| *C08K 3/04* | (2006.01) | |
| *C08L 27/16* | (2006.01) | |
| *C09K 3/10* | (2006.01) | |
| *F16G 1/06* | (2006.01) | |
| *F16G 1/28* | (2006.01) | |
| *F16G 5/04* | (2006.01) | |
| *F16G 5/20* | (2006.01) | |
| *F16J 3/02* | (2006.01) | |
| *F16J 15/10* | (2006.01) | |
| *F16L 11/06* | (2006.01) | |

(52) U.S. Cl.
CPC ............... *C08L 15/02* (2013.01); *C08K 3/04* (2013.01); *C08L 27/16* (2013.01); *C09K 3/1009* (2013.01); *F16G 1/06* (2013.01); *F16G 1/28* (2013.01); *F16G 5/04* (2013.01); *F16G 5/20* (2013.01); *F16J 3/02* (2013.01); *F16J 15/102* (2013.01); *F16L 11/06* (2013.01); *C08L 2205/025* (2013.01); *C08L 2312/00* (2013.01); *Y10T 428/139* (2015.01)

(58) Field of Classification Search
CPC ............... C08L 15/02; C08L 2205/025; C08L 2312/00; C08K 3/04; C09K 3/1009; F16G 1/06; F16G 1/28; F16G 5/04; F16G 5/20; F16J 3/02; F16J 15/102; F16L 11/06
USPC ........................................................ 428/36.9
See application file for complete search history.

(56) References Cited

U.S. PATENT DOCUMENTS

| | | | |
|---|---|---|---|
| 4,158,678 A | 6/1979 | Tatemoto et al. | |
| 4,243,770 A * | 1/1981 | Tatemoto | C08F 8/18 525/326.3 |
| 4,543,394 A | 9/1985 | Finlay et al. | |
| 4,861,836 A | 8/1989 | Tatemoto et al. | |
| 4,962,236 A | 10/1990 | Tatemoto et al. | |
| 4,988,562 A | 1/1991 | Ryoke et al. | |
| 5,198,136 A | 3/1993 | Tatemoto et al. | |
| 5,508,355 A | 4/1996 | Toda et al. | |
| 5,700,861 A | 12/1997 | Tomihashi et al. | |
| 6,232,390 B1 | 5/2001 | Ono et al. | |
| 6,252,006 B1 | 6/2001 | Tomihashi et al. | |
| 6,346,587 B1 | 2/2002 | Kruger et al. | |
| 9,006,328 B2 | 4/2015 | Ota et al. | |
| 9,045,614 B2 | 6/2015 | Ota et al. | |
| 9,068,053 B2 | 6/2015 | Yano et al. | |

(Continued)

FOREIGN PATENT DOCUMENTS

| | | |
|---|---|---|
| CN | 1989202 A | 6/2007 |
| DE | 19812755 A1 | 9/1999 |

(Continued)

OTHER PUBLICATIONS

JP2002-192528A—machine translation.*

(Continued)

*Primary Examiner* — Ling Siu Choi
*Assistant Examiner* — Ronald Grinsted
(74) *Attorney, Agent, or Firm* — Sughrue Mion, PLLC

(57) ABSTRACT

A fluororubber composition including a fluororubber having an iodine content of 10 to 90 mol % for the total mole of the polymer end groups and a carbon black (B), wherein a difference (δG'), represented by G'(1%)-G'(100%), is not lower than 120 kPa and not higher than 3,000 kPa, where G'(1%) denotes a shear modulus at a dynamic strain of 1% under an uncrosslinked state and G'(100%) denotes a shear modulus at a dynamic strain of 100% under an uncrosslinked state, and G'(1%) and G'(100%) are determined by a dynamic viscoelasticity test with a rubber process analyzer (RPA) in a condition that the measurement frequency is 1 Hz and the measurement temperature is 100° C.

11 Claims, 2 Drawing Sheets

(56) References Cited

U.S. PATENT DOCUMENTS

| | | |
|---|---|---|
| 2001/0031815 A1 | 10/2001 | Nakano et al. |
| 2005/0085576 A1 | 4/2005 | Kinoshita et al. |
| 2005/0159557 A1 | 7/2005 | Fukushi et al. |
| 2008/0248225 A1 | 10/2008 | Bandyopadhyay |
| 2008/0306196 A1 | 12/2008 | Irie et al. |
| 2009/0263603 A1 | 10/2009 | Maeda et al. |
| 2010/0004415 A1 | 1/2010 | Maeda et al. |
| 2010/0051259 A1 | 3/2010 | Pessin et al. |
| 2010/0069558 A1 | 3/2010 | Stanga et al. |
| 2010/0216933 A1 | 8/2010 | Wang |
| 2011/0200777 A1 | 8/2011 | Doi et al. |
| 2011/0269911 A1 | 11/2011 | Morita et al. |
| 2011/0277918 A1 | 11/2011 | Lee et al. |
| 2012/0067706 A1 | 3/2012 | Terada et al. |
| 2012/0077924 A1 | 3/2012 | Ota et al. |
| 2012/0077926 A1 | 3/2012 | Ota et al. |
| 2012/0077927 A1 | 3/2012 | Ota et al. |
| 2012/0077938 A1 | 3/2012 | Terada et al. |
| 2012/0077939 A1 | 3/2012 | Ota et al. |
| 2012/0095150 A1 | 4/2012 | Ota et al. |
| 2012/0095151 A1 | 4/2012 | Terada et al. |
| 2012/0259054 A1 | 10/2012 | Okutsu |
| 2014/0228482 A1 | 8/2014 | Ota et al. |
| 2014/0288226 A1 | 9/2014 | Ota et al. |
| 2015/0031822 A1 | 1/2015 | Ota et al. |
| 2015/0133592 A1 | 5/2015 | Miyasaka et al. |
| 2015/0330537 A1 | 11/2015 | Ota |

FOREIGN PATENT DOCUMENTS

| | | |
|---|---|---|
| EP | 0683149 A2 | 11/1995 |
| EP | 2258767 A1 | 12/2010 |
| JP | 53-3495 | 1/1978 |
| JP | 53-125491 | 11/1978 |
| JP | 60-55050 A | 3/1985 |
| JP | 63-159336 A | 7/1988 |
| JP | 1-106330 A | 4/1989 |
| JP | 1-153745 A | 6/1989 |
| JP | 2-124913 A | 5/1990 |
| JP | 2-308841 A | 12/1990 |
| JP | 3-122153 A | 5/1991 |
| JP | 4-359946 A | 12/1992 |
| JP | 6-25500 A | 2/1994 |
| JP | 7-11087 A | 1/1995 |
| JP | 7-134469 A | 5/1995 |
| JP | 7-196881 A | 8/1995 |
| JP | 8-3017 B2 | 1/1996 |
| JP | 10-219062 A | 8/1998 |
| JP | 11-193332 A | 7/1999 |
| JP | 11-344165 A | 12/1999 |
| JP | 2001-114964 A | 4/2001 |
| JP | 2001-261846 A | 9/2001 |
| JP | 2002-192528 A | 7/2002 |
| JP | 2002192528 A * | 7/2002 |
| JP | 2003-13041 A | 1/2003 |
| JP | 2004-26897 A | 1/2004 |
| JP | 2004-123878 A | 4/2004 |
| JP | 2005-113017 A | 4/2005 |
| JP | 2006-70132 A | 3/2006 |
| JP | 2006-513304 A | 4/2006 |
| JP | 2007-137941 A | 6/2007 |
| JP | 2008-184496 A | 8/2008 |
| JP | 2009-224048 A | 10/2009 |
| JP | 2009-227780 A | 10/2009 |
| JP | 2009-256455 A | 11/2009 |
| JP | 2010-24339 A | 2/2010 |
| JP | 2010-285526 A | 12/2010 |
| JP | 2011-148902 A | 8/2011 |
| JP | 2011-522921 A | 8/2011 |
| JP | 2011148902 A * | 8/2011 |
| JP | 2012-519221 A | 8/2012 |
| JP | 2013-14640 A | 1/2013 |
| JP | 2013-173929 A | 9/2013 |
| JP | 2013-173930 A | 9/2013 |
| JP | 2013-175462 A | 9/2013 |
| WO | 95/15359 A1 | 6/1995 |
| WO | 98/07784 A1 | 2/1998 |
| WO | 03/076535 A1 | 9/2003 |
| WO | 2004/067618 A1 | 8/2004 |
| WO | 2007/135937 A1 | 11/2007 |
| WO | 2007/148759 A1 | 12/2007 |
| WO | 2010007699 A1 | 1/2010 |
| WO | 2010/101304 A1 | 9/2010 |
| WO | 2012/026006 A1 | 3/2012 |
| WO | 2012/026007 A1 | 3/2012 |
| WO | 2012/026534 A1 | 3/2012 |
| WO | 2012/026552 A1 | 3/2012 |
| WO | 2012/026553 A1 | 3/2012 |
| WO | 2012/026554 A1 | 3/2012 |
| WO | 2012/026555 A1 | 3/2012 |
| WO | 2012/026556 A1 | 3/2012 |
| WO | 2012/026558 A1 | 3/2012 |
| WO | 2012/026559 A1 | 3/2012 |
| WO | 2013/108935 A1 | 7/2013 |
| WO | 2013/108936 A1 | 7/2013 |
| WO | 2013/125731 A1 | 8/2013 |
| WO | 2013/125735 A1 | 8/2013 |
| WO | 2013/125736 A1 | 8/2013 |

OTHER PUBLICATIONS

JP2011-148902A—machine translation.*
Carbon Black, Titanium Dioxide, and Talc. Lyon, France: International Agency for Research on Cancer, 2010. Print. ISBN 978-2-832-1293-5Ti.
An Office Action dated Apr. 5, 2017, which issued during the prosecution of U.S. Appl. No. 14/380,133.
Communication dated Dec. 8, 2014, issued by the Japanese Patent Office in related Japanese application No. 2014-506387.
Communication dated Oct. 7, 2015 from the United States Patent and Trademark Office in counterpart U.S. Appl. No. 14/380,197.
"Physical & Chemical Properties", Anonymous, Jan. 20, 2006 (Jan. 20, 2006), XP55248779, 7 pages total.
Communication dated Jul. 21, 2015 from the European Patent Office in counterpart application No. 13752402.1.
Communication dated Jul. 21, 2015 from the European Patent Office in counterpart application No. 13751700.9.
Communication dated Mar. 6, 2015 from the European Patent Office in application No. 13739075.3.
Communication dated Mar. 3, 2015 from European Patent Office in application No. 13738608.2.
International Search Report and Written Opinion of the International Searching Authority dated Mar. 19, 2013 for PCT/JP2013/051512.
International Search Report and Written Opinion of the International Searching Authority dated Mar. 19, 2013 for PCT/JP2013/051513.
International Search Report and Written Opinion of the International Searching Authority dated Jun. 4, 2013 for PCT/JP2013/055603.
International Search Report and Written Opinion of the International Searching Authority dated Jun. 4, 2013 for PCT/JP2013/055611.
International Search Report and Written Opinion of the International Searching Authority dated May 14, 2013 for PCT/JP2013/055612.
Communication dated Nov. 9, 2017 from the United States Patent and Trademark Office in related U.S. Appl. No. 14/380,133.
Communication dated Jul. 14, 2017 from the European Patent Office in counterpart application No. 17167250.4.
U.S. Appl. No. 14/380,197, filed Aug. 21, 2014, Ota et al.
U.S. Appl. No. 14/380,133, filed Aug. 21, 2014, Ota et al.
U.S. Appl. No. 14/361,807, filed May 30, 2014, Ota et al.
U.S. Appl. No. 14/346,156, filed Mar. 20, 2014, Ota et al.

* cited by examiner (a)

(b)

(c)

FLUORORUBBER COMPOSITION

This application is a National Stage of International Application No. PCT/JP2013/055612, filed on Feb. 22, 2013, which claims priority from U.S. Provisional Application No. 61/602,862 filed on Feb. 24, 2012, the contents of all of which are incorporated herein by reference in its entirety.

TECHNICAL FIELD

The present invention relates to a fluororubber composition able to give a crosslinked fluororubber article excellent in tensile properties and tensile fatigue properties at high temperatures.

BACKGROUND ART

Fluororubbers are known to exhibit excellent chemical resistance, oil resistance, heat resistance, cold resistance and the like.

Patent Literature 1 proposes a bromine-containing fluororubber composition having improved compression set resistance even after being heated to a high temperature.

Patent Literature 2 proposes a vulcanized fluororubber composition which achieves an extremely high tensile strength and which gives a crosslinked article having similarly excellent compression set resistance, heat resistance, oil resistance and chemical resistance to a conventional vulcanized fluororubber.

Patent Literature 3 proposes a fluorine-containing elastomer which can give a vulcanized product having excellent elongation during breaking at a high temperature such as 100° C. and excellent compression set characteristics at a low temperature such as 0° C.

As a composition having excellent high-temperature strength, Patent Literature 4 proposes a fluororubber composition obtained by incorporating 5 to 100 parts by weight of a fluorine-containing thermoplastic elastomer in 100 parts by weight of a fluororesin (b).

CITATION LIST

Patent Literature

Patent Literature 1 JP S60-55050 A
Patent Literature 2 JP H3-122153 A
Patent Literature 3 JP 2008-184496 A
Patent Literature 4 JP H06-25500 A

SUMMARY OF INVENTION

Technical Problem

For bladders used in the manufacture of tire, particularly good tensile properties and tensile fatigue properties in high temperature environments are required.

An objective of the present invention is to provide a fluororubber composition able to give a crosslinked fluororubber article that exhibits not only heat resistance, but also excellent tensile properties and tensile fatigue properties at high temperatures.

Solution to Problem

One aspect of the present invention is a fluororubber composition (hereinafter, also referred to as "first fluororubber composition") containing a fluororubber (A) having an iodine content of 10 to 90 mol % for the total mole of the polymer end groups and a carbon black (B), wherein a difference (δG'), represented by G'(1%)-G'(100%), is not lower than 120 kPa and not higher than 3,000 kPa, where G'(1%) denotes a shear modulus at a dynamic strain of 1% under an uncrosslinked state, and G' (100%) denotes a shear modulus at a dynamic strain of 100% under an uncrosslinked state, and G'(1%) and G'(100%) are determined by a dynamic viscoelasticity test with a rubber process analyzer (RPA) in a condition that the measurement frequency is 1 Hz and the measurement temperature is 100° C.

Yet another aspect of the present invention is a fluororubber composition (hereinafter, also referred to as "second fluororubber composition") containing a fluororubber (A1), a fluororubber (A2), and a carbon black (B), wherein the fluororubber (A1) is a polymer having an iodine atom at both ends of its main chain, the fluororubber (A2) is a polymer having an iodine atom at only one end of its main chain, and a difference (δG'), represented by G'(1%)-G'(100%), is not lower than 120 kPa and not higher than 3,000 kPa, where G'(1%) denotes a shear modulus at a dynamic strain of 1% under uncrosslinked state, G'(100%) denotes a shear modulus at a dynamic strain of 100% under an uncrosslinked state, and G'(1%) and G'(100%) are determined by a dynamic viscoelasticity test with a rubber process analyzer (RPA) in a condition that the measurement frequency is 1 Hz and the measurement temperature is 100° C.

Yet another aspect of the present invention is a crosslinked fluororubber article obtained by vulcanizing the fluororubber composition. The present invention further relates to a hose including a crosslinked fluororubber layer obtainable by crosslinking the fluororubber composition. The present invention further relates to a sealing material including a crosslinked fluororubber layer obtainable by crosslinking the fluororubber composition. The present invention further relates to a diaphragm including a crosslinked fluororubber layer obtainable by crosslinking the fluororubber composition. The present invention further relates to a belt and a belt material including a crosslinked fluororubber layer obtainable by crosslinking the fluororubber composition.

Yet another aspect of the present invention is a fluororubber having an iodine content of 10 to 90 mol % for the total mole of the polymer end groups.

Yet another aspect of the present invention is a fluororubber composition (hereinafter, also relates to as "third fluororubber composition") containing a fluororubber having an iodine content of 10 to 90 mol % for the total mole of the polymer end groups and a carbon black.

Another aspect of the present invention is a fluororubber composition (hereinafter, also relates to as "fourth fluororubber composition") containing a fluororubber (A1), a fluororubber (A2), and a carbon black (B), wherein the fluororubber (A1) is a polymer having an iodine atom at both ends of its main chain and the fluororubber (A2) is a polymer having an iodine atom at only one end of its main chain.

Advantageous Effects of Invention

According to the present invention, it is possible to provide a fluororubber composition able to give a crosslinked fluororubber article that exhibits not only heat resistance, but also excellent tensile properties and tensile fatigue properties at high temperatures.

DESCRIPTION OF EMBODIMENTS

Figure 1:
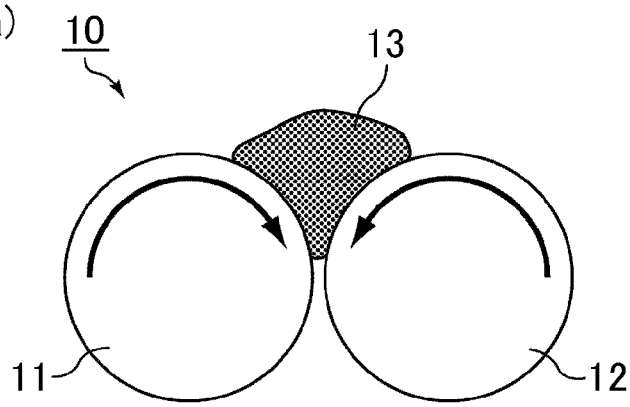
FIG. 1 is a diagram showing a schematic view of the mixing method used in step (2-1) and step (2-2).
Figure 1:
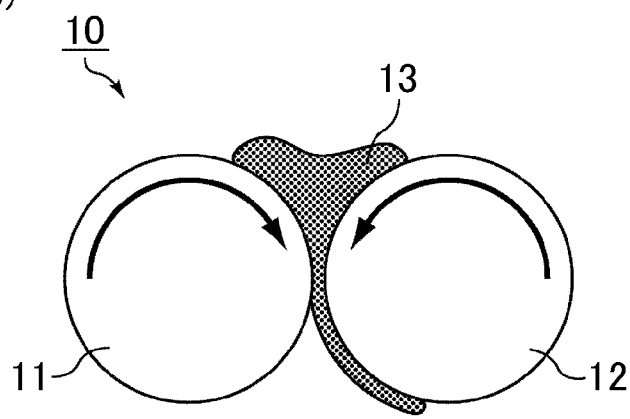
Figure 1:
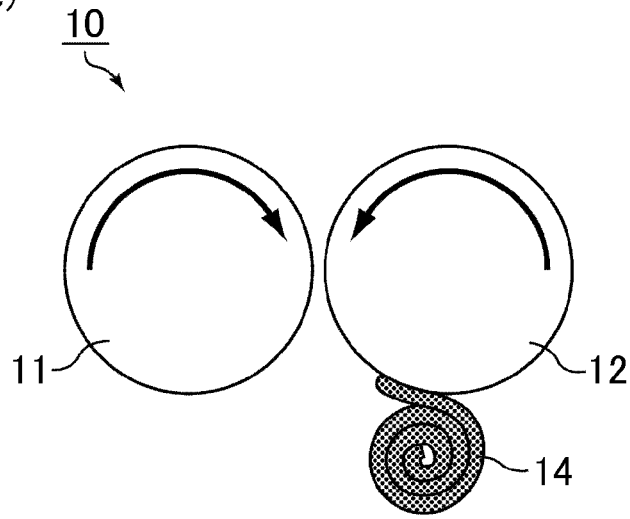

The first fluororubber composition of the present invention is a fluororubber composition containing a fluororubber (A) having an iodine content of 10 to 90 mol % for the total mole of the polymer end groups and a carbon black (B), wherein a difference (δG'), represented by G'(1%)-G' (100%), is not lower than 120 kPa and not higher than 3,000 kPa, where G'(1%) denotes a shear modulus at a dynamic strain of 1% under uncrosslinked state, and G'(100%) denotes a shear modulus at a dynamic strain of 100% under an uncrosslinked state, and G' (1%) and G'(100%) are determined by a dynamic viscoelasticity test with a rubber process analyzer (RPA) in a condition that the measurement frequency is 1 Hz and the measurement temperature is 100° C.

Because of containing the fluororubber (A) having an iodine content of 10 to 90 mol % for the total mole of the polymer end groups, the first fluororubber composition of the present invention can give a crosslinked article excellent in tensile properties and tensile fatigue properties at high temperatures.

Only one fluororubber may be used as the fluororubber (A), or two or more fluororubbers may be used in combination. For example, if two fluororubbers with different amounts of iodine are used in combination, the total amount of iodine in the two fluororubbers is 10 to 90 mol % for the total mole of the polymer end groups.

For a crosslinked article excellent in tensile properties and tensile fatigue properties at high temperatures, the fluororubber (A) is preferably has an iodine content of 11 to 89 mol %, more preferably 12 to 88 mol %, further preferably 12 to 80 mol %, and especially preferably 12 to 70 mol %, and the most preferably 12 to 64 mol % for the total mole of the polymer end groups.

Examples of the polymer end group of the fluororubber (A) include $ICH_2CF_2-$, $ICF_2CH_2-$, $ICF_2CF_2-$, $HCF_2CH_2-$, $HCF_2CF_2-$, $HCF_2CF(CF_3)-$, $HCF(CF_3)CF_2-$, $CH_3CF_2-$, $HOCH_2CF_2-$, $HOOCCH_2-$, $CF_3C(=O)CF_2-$, $HOOCCF(CF_3)-$, $HOOCCF_2-$, $CF(CF_3)_2-$, and $CF_3CF_2-$. Particularly important among these are $ICH_2CF_2-$, $ICF_2CH_2-$, $ICF_2CF_2-$, $HCF_2CH_2-$, $HCF_2CF_2-$, $HCF_2CF(CF_3)-$, $CH_3CF_2-$, $HOCH_2CF_2-$, $CF(CF_3)_2-$, and $CF_3CF_2-$.

The iodine content for the total mole of the polymer end groups can be measured by, for example, $^1$H-NMR or $^{19}$F-NMR. Specific examples of the measurement are described below.

Polymer end group A: $ICH_2CF_2-$ ($^1$H-NMR: 3.8 to 4.0 ppm, 2H, multiplet)

Polymer end group B: $ICF_2CH_2-$ ($^{19}$F-NMR: −38 ppm, 2F)

Polymer end group C: $ICF_2CF_2-$ ($^{19}$F-NMR: −60 to −61 ppm, 2F)

Polymer end group D: $HCF_2-$ ($^1$H-NMR: 6.0 to 6.8 ppm, 1H, multiplet)

Polymer end group E: $CH_3CF_2-$ ($^1$H-NMR: 1.78 ppm, 3H, triplet, J=19.2 Hz)

Polymer end group F: $HOCH_2CF_2-$ ($^1$H-NMR: 3.77 ppm, 2H, triplet, J=13.4 Hz)

Polymer end group G: $(CF_3)_2CF-$ ($^{19}$F-NMR: −78 ppm, 6F)

Polymer end group H: $CF_3CF_2-$ ($^{19}$F-NMR: −80 ppm, 3F)

If peaks of the polymer end groups are determined as above, the ratio (mol %) of each of the polymer end groups to the VdE monomer, represented by $\phi_A$, $\phi_B$, $\phi_C$, $\phi_D$, $\phi_E$, $\phi_F$, $\phi_G$, or $\phi_H$, is calculated by the formula below:

$$\phi_X (\text{mol \%}) = \frac{S_X/n_X}{S_{VdF}/2} \times 100$$

wherein X represents a polymer end group A, B, C, D, E, F, G, or H; $\phi_X$ is a ratio of the polymer end group X to the VdF monomer; $S_X$ is an integrated value of the peak derived from the polymer end group X; $n_x$ is the number of a hydrogen atom or a fluorine atom assigned to the peak of the polymer end group X in $^1$H-NMR or $^{19}$F-NMR; and $S_{VdF}$ is a sum of integrated values of the peak derived from the VdF monomer.

If a chain transfer agent giving a polymer end group Y, which is a polymer end group other than those above, is used in polymerization, the ratio (mol %) of the polymer end group Y to the VdF monomer may be calculated by the same manner as described above.

The ratio (mol %) of the polymer end groups containing iodine to all the polymer end groups is calculated from the formula below:

$$\text{A ratio of the polymer end groups containing iodine (mol \%)} = \frac{\phi_A + \phi_B + \phi_C}{\phi_A + \phi_B + \phi_C + \phi_D + \phi_E + \phi_F + \phi_G + \phi_H + \phi_Y} \times 100$$

The fluororubber (A) can be produced by, for example, blending two or more fluororubbers obtained by iodine transfer polymerization.

More specifically, the fluororubber (A) can be produced by blending a fluororubber having iodine at both polymer ends and a fluororubber having iodine at one polymer end.

The fluororubber (A) can be produced by a single polymerization process. For example, a novel production method including polymerization using a monoiodine compound and a diiodine compound as chain transfer agents. In the polymerization, conditions such as temperature and pressure and a polymerization initiator, an emulsifier, and other additives can be selected as appropriate according to the composition or the amount of the fluororubber (A). The fluororubber (A) can be produced by production methods disclosed in JP 2009-52034 A and WO 2008/001895.

Examples of the polymerization initiator include: oil-soluble radical polymerization initiators represented by peroxy carbonates such as diisopropyl peroxy dicarbonate (IPP) and di-n-propyl peroxy dicarbonate (NPP); and water-soluble radical polymerization initiators such as ammonium salts, potassium salts, and sodium salts of persulfuric acid, perboric acid, perchloric acid, perphosphoric acid, and percarbonic acid.

Preferable examples of the emulsifier include salts of carboxylic acid having a fluorocarbon chain or a fluoropolyether chain from the perspective of suppressing chain transfer reaction to the molecules of the emulsifier.

Specifically, ammonium perfluorooctanoate, $CF_3(CF_2)_n COONH_4$ (n=2 to 8), $CHF_2(CF_2)_n COONH_4$ (n=6 to 8), $C_3F_7OCF(CF_3)CF_2OCF(CF_3)COONH_4$, and $CH_2=CFCF_2OCF(CF_3)CF_2OCF(CF_3)COONH_4$ may be used.

The second fluororubber composition of the present invention is a fluororubber composition containing a fluororubber (A1), a fluororubber (A2), and a carbon black (B), wherein the fluororubber (A1) is a polymer having an iodine atom at both ends of its main chain, the fluororubber (A2) is a polymer having an iodine atom at only one end of its main chain, and the difference (δG'), represented by G'(1%)-G'(100%), is not lower than 120 kPa and not higher than 3,000 kPa, where G'(1%) denotes a shear modulus at a dynamic strain of 1% under uncrosslinked state, G'(100%) denotes a shear modulus at a dynamic strain of 100% under an uncrosslinked state, and G'(1%) and G'(100%) are determined by a dynamic viscoelasticity test with a rubber process analyzer (RPA) in a condition that the measurement frequency is 1 Hz and the measurement temperature is 100° C.

Because of containing the fluororubber (A1), which is a polymer having an iodine atom at both end of its main chain, and a fluororubber (A2), which is a polymer having a iodine atom at only one end of its main chain, the second fluororubber composition of the present invention can give a crosslinked article excellent in tensile properties and tensile fatigue properties at high temperatures.

Conventionally, in order to improve compression set characteristics of fluororubbers, a technique of sealing the end of the polymer main chain with iodine has been developed. Particularly, a fluororubber in which both ends of its main chain are sealed with iodine tend to be used from the viewpoint of improving compression set characteristics.

The fluororubber composition of the present invention contains both a fluororubber having an iodine atom at only one end of its main chain and a fluororubber having an iodine atom at both ends of its main chain to significantly improve tensile properties at high temperatures of the crosslinked article to be obtained. It is considered the polymer having an iodine atom at only one end of its main chain is less likely to be bound by crosslinking in the crosslinked rubber structure, and leads to an improvement in tensile properties at high temperatures.

The fluororubber (A1) is a polymer having an iodine atom at both ends of its main chain. The presence of the iodine atom at both ends of the main chain may be confirmed by, for example, element analysis or NMR.

The fluororubber (A1) preferably has an iodine content of 0.001 to 10% by mass, more preferably 0.01 to 5% by mass, and further preferably 0.01 to 3% by mass in terms of favorably balanced physical properties. The amount of the iodine atom (% by mass) may be measured by element analysis.

The fluororubber (A2) is a polymer having an iodine atom at one end of its main chain. The presence of the iodine atom at one end of the main chain may be confirmed by, for example, element analysis or NMR.

The polymer having an iodine atom at one end is a polymer having no iodine atom at the other end of its main chain. For example, a polymer in which either of the ends of its main chain is an uncrosslinkable site is preferred.

Examples of the uncrosslinkable site include $HCF_2CH_2$—, $HCF_2CF_2$—, $HCF_2CF(CF_3)$—, $HCF(CF_3)CF_2$—, $CH_3CF_2$—, $HOCH_2CF_2$—, $HOOCCH_2$—, $CF_3C(\!\!=\!\!O)CF_2$—, $HOOCCF(CF_3)$—, $HOOCCF_2$—, $CF(CF_3)_2$—, and $CF_3CF_2$—. Particularly important among these are $HCF_2CH_2$—, $HCF_2CF_2$—, $HCF_2CF(CF_3)$—, $CH_3CF_2$—, $HOCH_2CF_2$—, and $C_F(CF_3)_2$—, and $CF_3CF_2$—.

The fluororubber (A2) preferably has an iodine content of 0.001 to 5% by mass, more preferably 0.01 to 3% by mass, and further preferably 0.01 to 2% by mass in terms of favorably balanced physical properties.

The fluororubbers (A1) and (A2) can be produced by a polymerization method using an iodine compound, which is known as iodine transfer polymerization. For example, the fluororubber (A1) having an iodine atom at both ends of its main chain and the fluororubber (A2) having an iodine atom at one end of its main chain can be produced by adjusting the amount of the iodine compound (chain transfer agent) and the polymerization time in a known iodine transfer polymerization method.

For example, $I(CF_2CF_2)_4I$ as a chain transfer agent may be used in polymerization to provide the fluororubber (A1).

For example, $(CF_3)_2CFI$, $F(CF_2CF_2)_2I$, or $F(CF_2CF_2)_3I$ as a transfer agent may be used in polymerization to provide the fluororubber (A2).

Accordingly, the fluororubber (A1) and fluororubber (A2) provided separately by polymerization can be blended to be used in the second fluororubber composition of the present invention.

The fluororubber (A1) and the fluororubber (A2) can be produced at the same time in a single polymerization process. For example, a novel production method including polymerization using a monoiodine compound and a diiodine compound as chain transfer agents to produce the fluororubber (A1) and the fluororubber (A2) by a single polymerization process.

For the method for producing the fluororubber (A1) and the fluororubber (A2), see "Polymeric Materials ENCYCLOPEDIA Volume 5, p 3847-3860, CRC Press".

The fluororubbers (A1) and (A2) in the second fluororubber composition of the present invention may be the same as or different from each other, except for the structure of the main chain ends.

In the following, the fluororubbers (A), (A1), and (A2) are described. The fluororubbers (A), (A1), and (A2) may have the same structure, except for the iodine content for the total mole of the polymer end groups and the structure of the main chain ends.

The fluororubbers (A), (A1), and (A2) used in the present invention preferably contain a structural unit derived from at least one type of monomer selected from the group consisting of tetrafluoroethylene (TFE), vinylidene fluoride (VdF) and a perfluoro ethylenically unsaturated compound represented by formula (1):

$$CF_2=CF-R_f^a \tag{1}$$

(where, $R_f^a$ is —$CF_3$ or —$OR_f^b$ ($R_f^b$ is a perfluoroalkyl group having 1 to 5 carbon atoms) (for example, hexafluoropropylene (HFP), a perfluoro(alkyl vinyl ether) (PAVE) and the like).

Examples of fluororubbers include vinylidene fluoride (VdF)-based fluororubbers, tetrafluoroethylene (TFE)/propylene (Pr)-based fluororubbers, tetrafluoroethylene (TFE)/propylene (Pr)/vinylidene fluoride (VdF)-based fluororubbers, ethylene/hexafluoropropylene (HFP)-based fluororubbers, ethylene (Et)/hexafluoropropylene (HFP)/vinylidene fluoride (VdF)-based fluororubbers, ethylene (Et)/hexafluoropropylene (HFP)/tetrafluoroethylene (TFE)-based fluororubbers, fluorosilicone-based fluororubbers and fluorophosphazene-based fluororubbers, and these may be used in isolation or as a combination at quantities that do not impair the effect of the present invention. Of these, VdF-based fluororubbers, TFE/Pr-based fluororubbers and TFE/Pr/VdF-based fluororubbers are more preferred from the perspectives of good thermal ageing resistance and oil resistance.

In the above-mentioned VdF-based fluororubber, The amount of VdF repeating units is preferably 20 mol % or more, more preferably 40 mol % or more, still more preferably 45 mol % or more, particularly preferably 50 mol % or more, more particularly preferably 55 mol % or more, and the most preferably 60 mol % or more, relative to the total number of moles of VdF repeating units and repeating units derived from other co-monomers. The amount of VdF repeating units is preferably 90 mol % or less, more preferably 85 mol % or less, still more preferably 80 mol % or less, particularly preferably 78 mol % or less, more particularly preferably 75 mol % or less, and the most preferably 70 mol % or less, relative to the total number of moles of VdF repeating units and repeating units derived from other co-monomers.

The amount of the repeating unit derived from other co-monomers is preferably 10 mol % or more, more preferably 15 mol % or more, still more preferably 20 mol % or more, particularly preferably 22 mol % or more, more particularly preferably 25 mol % or more, and the most preferably 30 mol % or more, relative to the total number of moles of VdF repeating units and repeating units derived from other co-monomers. The amount of the repeating unit derived from other co-monomers is preferably 80 mol % or less, more preferably 60 mol % or less, still more preferably 55 mol % or less, particularly preferably 50 mol % or less, more particularly preferably 45 mol % or less, and the most preferably 40 mol % or less, relative to the total number of moles of VdF repeating units and repeating units derived from other co-monomers.

In addition, co-monomers in the above-mentioned VdF-based fluororubber are not particularly limited as long as copolymerization with VdF is possible, and examples thereof include: fluorine-containing monomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ethers, and fluorine-containing monomers represented by general formula (2)

$$CH_2=CFR_f \qquad (2)$$

(where, $R_f$ is a straight chain or branched chain fluoroalkyl group having 1 to 12 carbon atoms); fluorine-free monomers such as ethylene (Et), propylene (Pr) or an alkyl vinyl ether; monomers having a crosslinkable group (a curing site); and reactive emulsifying agents. One or more of these monomers and compounds may be used.

As the aforementioned PAVE, perfluoro(methylvinylether) (PMVE) and perfluoro(propyl vinyl ether) (PPVE) are more preferred, and PMVE is especially preferred.

In addition, the aforementioned PAVE can be a perfluorovinyl ether represented by the formula: $CF_2=CFOCF_2OR_f^c$ (where, $R_f^c$ is a straight chain or branched chain perfluoroalkyl group having 1 to 6 carbon atoms, a cyclic perfluoroalkyl group having 5 to 6 carbon atoms, or a straight chain or branched chain perfluorooxyalkyl group having 2 to 6 carbon atoms and containing 1 to 3 oxygen atoms). $CF_2=CFOCF_2OCF_3$, $CF_2=CFOCF_2OCF_2CF_3$ and $CF_2=CFOCF_2OCF_2CF_2OCF_3$ are preferred, for example.

The above-mentioned fluorine-containing monomer (2) represented by formula (2) is preferably a monomer in which $R_f$ is a straight chain fluoroalkyl group, and more preferably a monomer in which $R_f$ is a straight chain perfluoroalkyl group. The number of carbon atoms in $R_f$ is preferably 1 to 6. Examples of the above-mentioned fluorine-containing monomer represented by formula (2) include $CH_2=CFCF_3$, $CH_2=CFCF_2CF_3$, $CH_2=CFCF_2CF_2CF_3$, $CH_2=CFCF_2CF_2CF_2CF_3$, and of these, 2,3,3,3-tetrafluoropropylene, which is represented by $CH_2=CFCF_3$, is preferred.

The above-mentioned VdF-based fluororubber is preferably at least one copolymer selected from the group consisting of VdF/HFP copolymers, VdF/TFE/HFP copolymers, VdF/CTFE copolymers, VdF/CTFE/TFE copolymers, VdF/PAVE copolymers, VdF/TFE/PAVE copolymers, VdF/HFP/PAVE copolymers, VdF/HFP/TFE/PAVE copolymers, VdF/TFE/propylene (Pr) copolymers, VdF/ethylene (Et)/HFP copolymers and copolymers of VdF and fluorine-containing monomers represented by formula (2), and more preferably contains at least one type of co-monomer selected from the group consisting of TFE, HFP, and PAVE as a co-monomer other than VdF. Of these, at least one type of copolymer selected from the group consisting of VdF/HFP copolymers, VdF/TFE/HFP copolymers, copolymers of VdF and fluorine-containing monomers represented by formula (2), VdF/PAVE copolymers, VdF/TFE/PAVE copolymers, VdF/HFP/PAVE copolymers and VdF/HFP/TFE/PAVE copolymers is preferred, at least one type of copolymer selected from the group consisting of VdF/HFP copolymers, VdF/HFP/TFE copolymers, copolymers of VdF and fluorine-containing monomers represented by formula (2) and VdF/PAVE copolymers is more preferred, and at least one type of polymer selected from the group consisting of VdF/HFP copolymers, copolymers of VdF and fluorine-containing monomers represented by formula (2) and VdF/PAVE copolymers is even more preferred.

In the case of a VdF/HFP copolymer, the VdF/HFP composition is preferably (45 to 85)/(55 to 15) (mol %), more preferably (50 to 80)/(50 to 20) (mol %), and further preferably (60 to 80)/(40 to 20) (mol %).

Also, in one preferable embodiment, the VdF/HFP composition is (50 to 78)/(50 to 22) (mol %).

In the case of a VdF/TFE/HFP copolymer, the VdF/TFE/HFP composition is preferably (30 to 80)/(4 to 35)/(10 to 35) (mol %).

Also, in another preferable embodiment, the VdF/TFE/HFP composition is (30 to 80)/(4 to 20)/(10 to 35).

In the case of a VdF/PAVE copolymer, the VdF/PAVE composition is preferably (65 to 90)/(35 to 10) (mol %).

Also, in another preferable embodiment, the VdF/PAVE composition is (50 to 78)/(50 to 22) (mol %).

In the case of a VdF/TFE/PAVE copolymer, the VdF/TFE/PAVE composition is preferably (40 to 80)/(3 to 40)/(15 to 35) (mol %).

In the case of a VdF/HFP/PAVE copolymer, the VdF/HFP/PAVE composition is preferably (65 to 90)/(3 to 25)/(3 to 25) (mol %).

In the case of a VdF/HFP/TFE/PAVE copolymer, the VdF/HFP/TFE/PAVE composition is preferably (40 to 90)/(0 to 25)/(0 to 40)/(3 to 35) (mol %), and more preferably (40 to 80)/(3 to 25)/(3 to 40)/(3 to 25) (mol %).

In the case of a copolymer of VdF and a fluorine-containing monomer represented by formula (2), it is preferable for the VdF/fluorine-containing monomer (2) unit molar ratio to be between 85/15 and 20/80 and for monomer units other than VdF and the fluorine-containing monomer (2) to account for 0 to 50 mol % of the total amount of monomer units, and the VdF/fluorine-containing monomer (2) unit molar ratio is more preferably between 80/20 and 20/80.

Also, the VdF/fluorine-containing monomer (2) unit composition is preferably 78/22 to 50/50 (mol %). In addition, it is also preferable for the VdF/fluorine-containing monomer (2) unit molar ratio to be between 85/15 and 50/50 and for monomer units other than VdF and the fluorine-containing monomer (2) to account for 1 to 50 mol % of the total amount of monomer units. Preferred examples of monomer units other than VdF and the fluorine-containing monomer unit (2) include the above-mentioned VdF co-monomers, such as TFE, HFP, PMVE, perfluoroethyl vinyl ether (PEVE), PPVE, CTFE, trifluoroethylene, hexafluoroisobutene, vinyl fluoride, ethylene (Et), propylene (Pr), alkyl vinyl ethers, monomers giving a crosslinkable group and reactive emulsifying agents. Of these, PMVE, CTFE, HFP and TFE are more preferred.

A TFE/propylene (Pr)-based fluororubber means a fluorine-containing copolymer comprising 45 to 70 mol % of TFE and 55 to 30 mol % of propylene (Pr). In addition to these two components, this type of fluororubber may contain 0 to 40 mol % of a specific third component (for example, PAVE).

In the case of an Ethylene (Et)/HFP copolymer, the Et/HFP composition is preferably (35 to 80)/(65 to 20) (mol %), and more preferably (40 to 75)/(60 to 25) (mol %).

In the case of an Et/HFP/TFE copolymer, the Et/HFP/TFE composition is preferably (35 to 75)/(25 to 50)/(0 to 15) (mol %), and more preferably (45 to 75)/(25 to 45)/(0 to 10) (mol %).

From the perspective of efficient improvement of tensile properties and tensile fatigue properties at high temperatures of the crosslinked fluororubber articles to be obtained from the first and second fluororubber compositions of the present invention, the fluororubbers (A), (A1), and (A2) are preferably binary copolymers containing only a VdF unit and a HFP unit, a polymer unit derived from the fluorine-containing monomer represented by formula (2), or a PAVE unit. In other words, the fluororubbers (A), (A1), and (A2) each are preferably at least one binary copolymer selected from the group consisting of VdF/HFP copolymers, copolymers of VdF and a fluorine-containing monomer represented by formula (2), and VdF/PAVE copolymers.

Also, the fluororubbers (A), (A1), and (A2) each are more preferably at least one binary copolymer selected form the group consisting of VdF/HFP copolymers, a VdF/2,3,3,3-tetrafluoropropylene copolymers, and VdF/PAVE copolymers, and especially preferably at least one binary copolymer selected from the group consisting of a VdF/HFP copolymer and a VdF/2,3,3,3-tetrafluoropropylene copolymer.

The number average molecular weight (Mn) of each of the fluororubbers (A), (A1), and (A2) is preferably 5,000 to 500,000, more preferably 10,000 to 500,000, and especially preferably 20,000 to 500,000.

In addition, in cases where, for example, it is necessary for the fluororubber composition to have a low viscosity, other fluororubbers may be blended. Examples of other fluororubbers include low molecular weight liquid fluororubbers (number average molecular weight: 1,000 or higher), low molecular weight fluororubbers having number average molecular weights of approximately 10,000 and fluororubbers having number average molecular weights of approximately 100,000 to 200,000.

From the perspective of processability, the Mooney viscosity at 100° C. of the fluororubbers (A), (A1), and (A2) is 20 to 200, and preferably 30 to 180. The Mooney viscosity is measured in accordance with JIS K6300.

The materials exemplified as the aforementioned fluororubbers constitute the primary monomer, and it is possible to use a material obtained by copolymerizing a monomer giving a peroxide-crosslinkable group as long as it does not impair the effects of the present invention.

The monomer giving a peroxide-crosslinkable group should be one able to suitably introduce a peroxide-crosslinkable group according to the production method and the like, such as a publicly known polymerizable compound or chain transfer agent containing an iodine atom.

Preferred examples of monomers giving peroxide-crosslinkable groups include a compound represented by general formula (3):

$$CY^1_2=CY^2R_f^2X^1 \quad (3)$$

(where, $Y^1$ and $Y^2$ each denote a fluorine atom, a hydrogen atom or —$CH_3$; $R_f^2$ denotes a straight chain or branched chain fluorine-containing alkylene group which may have one or more ether bonds, which may have an aromatic ring and in which some or all of the hydrogen atoms are substituted by fluorine atoms; and $X^1$ denotes an iodine atom).

Specifically, it is possible to use, for example, an iodine-containing monomer represented by general formula (4):

$$CY^1_2=CY^2R_f^3CHR^1—X^1 \quad (4)$$

(where, $Y^1$, $Y^2$ and $X^1$ are the same as mentioned above, $R_f^3$ denotes a straight chain or branched chain fluorine-containing alkylene group which may have one or more ether bonds and in which some or all of the hydrogen atoms are substituted by fluorine atoms, that is, a straight chain or branched chain fluorine-containing alkylene group in which some or all of the hydrogen atoms are substituted by fluorine atoms, a straight chain or branched chain fluorine-containing oxyalkylene group in which some or all of the hydrogen atoms are substituted by fluorine atoms or a straight chain or branched chain fluorine-containing polyoxyalkylene group in which some or all of the hydrogen atoms are substituted by fluorine atoms; and $R^1$ denotes a hydrogen atom or a methyl group), or any one of iodine-containing monomers represented by general formulae (5) to (22):

$$CY^4_2=CY^4(CF_2)_n—X^1 \quad (5)$$

(where, the $Y^4$ groups may be the same or different, and are hydrogen atoms or fluorine atoms, and n is an integer between 1 and 8)

$$CF_2=CFCF_2R_f^4—X^1 \quad (6)$$

(where, $R_f^4$ is —$(OCF_2)_n$— or —$(OCF(CF_3))_n$— [Chem. 1]

and n is an integer between 0 and 5)

$$CF_2=CFCF_2(OCF(CF_3)CF_2)_m(OCH_2CF_2CF_2)_nOCH_2CF_2—X^1 \quad (7)$$

(where, m is an integer between 0 and 5 and n is an integer between 0 and 5)

$$CF_2=CFCF_2(OCH_2CF_2CF_2)_m(OCF(CF_3)CF_2)_nOCF(CF_3)—X^1 \quad (8)$$

(where, m is an integer between 0 and 5 and n is an integer between 0 and 5)

$$CF_2=CF(OCF_2CF(CF_3))_mO(CF_2)_n—X^1 \quad (9)$$

(where, m is an integer between 0 and 5 and n is an integer between 1 and 8)

$$CF_2=CF(OCF_2CF(CF_3))_m—X^1 \quad (10)$$

(where, m is an integer between 1 and 5)

$$CF_2=CFOCF_2(CF(CF_3)OCF_2)_nCF(—X^1)CF_3 \quad (11)$$

(where, n is an integer between 1 and 4)

$$CF_2=CFO(CF_2)_nOCF(CF_3)-X^1 \quad (12)$$

(where, n is an integer between 2 and 5)

$$CF_2=CFO(CF_2)_n-(C_6H_4)-X^1 \quad (13)$$

(where, n is an integer between 1 and 6)

$$CF_2=CF(OCF_2CF(CF_3))_nOCF_2CF(CF_3)-X^1 \quad (14)$$

(where, n is an integer between 1 and 2)

$$CH_2=CFCF_2O(CF(CF_3)CF_2O)_nCF(CF_3)-X^1 \quad (15)$$

(where, n is an integer between 0 and 5)

$$CF_2=CFO(CF_2CF(CF_3)O)_m(CF_2)_n-X^1 \quad (16)$$

(where, m is an integer between 0 and 5 and n is an integer between 1 and 3)

$$CH_2=CFCF_2OCF(CF_3)OCF(CF_3)-X^1 \quad (17)$$

$$CH_2=CFCF_2OCH_2CF_2-X^1 \quad (18)$$

$$CF_2=CFO(CF_2CF(CF_3)O)_mCF_2CF(CF_3)-X^1 \quad (19)$$

(where, m is an integer of 0 or higher)

$$CF_2=CFOCF(CF_3)CF_2O(CF_2)_n-X^1 \quad (20)$$

(where, n is an integer of 1 or higher)

$$CF_2=CFOCF_2OCF_2CF(CF_3)OCF_2-X^1 \quad (21)$$

$$CH_2=CH-(CF_2)_nX^1 \quad (22)$$

(where, n is an integer between 2 and 8)
(in general formulae (5) to (22), X' is the same as mentioned above),
and it is possible to use these in isolation or as an arbitrary combination thereof.

The iodine-containing monomer represented by general formula (4) is preferably an iodine-containing fluorinated vinyl ether represented by general formula (23):

[Chem. 2]

$$I(CH_2CF_2CF_2O)_m(\overset{CF_3}{\underset{|}{C}}FCF_2O)_nCF=CF_2 \quad (23)$$

(where, m is an integer between 1 and 5 and n is an integer between 0 and 3).
More specifically, it is possible to use

[Chem. 3]

I CH$_2$CF$_2$CF$_2$OCF=CF$_2$,  I (CH$_2$CF$_2$CF$_2$O)$_2$CF=CF$_2$,

I (CH$_2$CF$_2$CF$_2$O)$_3$CF=CF$_2$,  I CH$_2$CF$_2$CF$_2$OCFCF$_2$OCF$_3$)$_3$CF=CF$_2$,
$\qquad\qquad\qquad\qquad\qquad\qquad\qquad\quad |$
$\qquad\qquad\qquad\qquad\qquad\qquad\qquad\ CF_3$ I CH$_2$CF$_2$CF$_2$O($\overset{CF_3}{\underset{|}{C}}$FCF$_2$O)$_2$CF=CF$_2$ and the like, but of these, ICH$_2$CF$_2$CF$_2$OCF=CF$_2$ is preferred.

Specifically, the iodine-containing monomer represented by general formula (5) is preferably ICF$_2$CF$_2$CF=CH$_2$ or I(CF$_2$CF$_2$)$_2$CF=CH$_2$.

Specifically, the iodine-containing monomer represented by general formula (9) is preferably I(CF$_2$CF$_2$)$_2$OCF=CF$_2$.

Specifically, the iodine-containing monomer represented by general formula (22) is preferably CH$_2$=CHCF$_2$CF$_2$I or I(CF$_2$CF$_2$)$_2$CH=CH$_2$.

(B) Carbon Black

The first and second fluororubber compositions contain a carbon black (B). Examples of types of the carbon black (B) include furnace black, acetylene black, thermal black, channel black and graphite, and specific examples thereof include SAF-HS (N$_2$SA: 142 m$^2$/g, DBP: 130 ml/100 g), SAF (N$_2$SA: 142 m$^2$/g, DBP: 115 ml/100 g), N234 (N$_2$SA: 126 m$^2$/g, DBP: 125 ml/100 g), ISAF (N$_2$SA: 119 m$^2$/g, DBP: 114 ml/100 g), ISAF-LS (N$_2$SA: 106 m$^2$/g, DBP: 75 ml/100 g), ISAF-HS (N$_2$SA: 99 m$^2$/g, DBP: 129 ml/100 g), N339 (N$_2$SA: 93 m$^2$/g, DBP: 119 ml/100 g), HAF-LS (N$_2$SA: 84 m$^2$/g, DBP: 75 ml/100 g), HAS-HS (N$_2$SA: 82 m$^2$/g, DBP: 126 ml/100 g), HAF (N$_2$SA: 79 m$^2$/g, DBP: 101 ml/100 g), N351 (N$_2$SA: 74 m$^2$/g, DBP: 127 ml/100 g), LI-HAF (N$_2$SA: 74 m$^2$/g, DBP: 101 ml/100 g), MAF-HS (N$_2$SA: 56 m$^2$/g, DBP: 158 ml/100 g), MAF (N$_2$SA: 49 m$^2$/g, DBP: 133 ml/100 g), FEF-HS (N$_2$SA: 42 m$^2$/g, DBP: 160 ml/100 g), FEF (N$_2$SA: 42 m$^2$/g, DBP: 115 ml/100 g), SRF-HS (N$_2$SA: 32 m$^2$/g, DBP: 140 ml/100 g), SRF-HS (N$_2$SA: 29 m$^2$/g, DBP: 152 ml/100 g), GPF (N$_2$SA: 27 m$^2$/g, DBP: 87 ml/100 g), and SRF (N$_2$SA: 27 m$^2$/g, DBP: 68 ml/100 g). Of these, SAF-HS, SAF, N234, ISAF, ISAF-LS, ISAF-HS, N339, HAF-LS, HAS-HS, HAF, N351, LI-HAF and MAF-HS are preferred.

These types of carbon black can be used in isolation or as a combination of two or more types thereof.

Of these, it is preferable for the carbon black to have a nitrogen adsorption specific surface area (N$_2$SA) of 25 to 180 m$^2$/g and a dibutyl phthalate (DBP) absorption number of 40 to 180 ml/100 g. Moreover, when a carbon black having high N$_2$SA and DBP values is used, the values for loss elastic modulus (E") and storage elastic modulus (E') of the resulting crosslinked fluororubber article increase, as mentioned below.

If the nitrogen adsorption specific surface area (N$_2$SA) is lower than 25 m$^2$/g, the mechanical properties tend to deteriorate when the carbon black is blended with a rubber, and for this reason, the nitrogen adsorption specific surface area (N$_2$SA) is preferably not lower than 50 m$^2$/g, more preferably not lower than 70 m$^2$/g, even more preferably not lower than 90 m$^2$/g, and especially preferably not lower than 110 m$^2$/g. The upper limit is preferably 180 m$^2$/g from the perspective of general ease of procurement.

If the dibutyl phthalate (DBP) absorption number is lower than 40 ml/100 g, the mechanical properties tend to deteriorate when the carbon black is blended with a rubber, and for this reason, the dibutyl phthalate (DBP) absorption number is preferably not lower than 50 ml/100 g, more preferably not lower than 60 ml/100 g, and especially preferably not lower than 80 ml/100 g. From the perspective of general ease of procurement, the upper limit is preferably 175 ml/100 g, and especially 170 ml/100 g.

In the first fluororubber composition of the present invention, it is preferable to blend 5 to 65 parts by mass of the carbon black (B) relative to 100 parts by mass of the fluororubber (A). If the blending amount of the carbon black (B) is too high or too low, the mechanical properties of the crosslinked article tend to deteriorate. From the perspective of obtaining a good balance of physical properties, the blending amount of the carbon black is preferably not lower than 6 parts by mass, and more preferably not lower than 10 parts by mass, relative to 100 parts by mass of the fluororubber (A), and is preferably not higher than 55 parts by mass, more preferably not higher than 50 parts by mass, even more preferably not higher than 49 parts by mass, and especially preferably not higher than 45 parts by mass, relative to 100 parts by mass of the fluororubber (A) from the perspective of obtaining a good balance of physical properties.

In the second fluororubber composition of the present invention, it is preferable to blend 5 to 65 parts by mass of the carbon black (B) relative to 100 parts by mass of the total amount of the fluororubbers (A1) and (A2). If the blending amount of the carbon black (B) is too high or too low, the mechanical properties of the cross linked article tend to deteriorate. From the perspective of obtaining a good balance of physical properties, the blending amount of the carbon black is preferably not lower than 6 parts by mass, and more preferably not lower than 10 parts by mass, relative to 100 parts by mass of the total amount of the fluororubbers (A1) and (A2), and is preferably not higher than 55 parts by mass, more preferably not higher than 50 parts by mass, even more preferably not higher than 49 parts by mass, and especially preferably not higher than 45 parts by mass, relative to 100 parts by mass of the total amount of the fluororubbers (A1) and (A2) from the perspective of obtaining a good balance of physical properties.

The first and second fluororubber compositions of the present invention may contain other components described below.

Crosslinking Agent (C) and Crosslinking Accelerator (D)

The fluororubber composition of the present invention preferably contains a crosslinking agent (C).

The crosslinking agent (C) and the crosslinking accelerator (D) can be selected as appropriate according to the crosslinking system, the type of fluororubber (A), (A1), and (A2) being crosslinked (for example, the copolymer composition, the presence/absence and type of crosslinkable groups), the specific intended use or mode of use of the obtained crosslinked article, mixing conditions and the like.

The crosslinking system may be a peroxide crosslinking system.

(Peroxide Crosslinking System)

Because of a carbon-carbon bond present at a cross linking site, a peroxide crosslinking system is superior to a polyol crosslinking system, in which a carbon-oxygen bond is present at a crosslinking site, or a polyamine crosslinking system, in which a carbon-nitrogen double bond is present, in chemical resistance and steam resistance.

A crosslinking agent for a peroxide crosslinking system should be a peroxide capable of readily generating peroxy radicals in the presence of heat or an oxidation-reduction system, and specific examples thereof include organic peroxides such as 1,1-bis(t-butylperoxy)-3,5,5-trimethylcyclohexane, 2,5-dimethylhexane-2,5-dihydroperoxide, di-t-butylperoxide, t-butylcumyl peroxide, dicumyl peroxide, α,α-bis(t-butylperoxy)-p-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, t-butylperoxybenzoate, t-butylperoxymaleic acid and t-butylperoxyisopropyl carbonate. Of these, 2,5-dimethyl-2,5-di(t-butylperoxy)hexane and 2,5-dimethyl-2,5-di(t-butylperoxy)hexyne-3 are preferred.

In addition, it is generally preferable to incorporate a crosslinking accelerator in a peroxide crosslinking system. Examples of crosslinking accelerators for peroxide-based crosslinking agents, and especially organic peroxide-based crosslinking agents, include triallyl cyanurate, triallyl isocyanurate (TRIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, N,N-diallylacrylamide, 1,6-divinyldodecafluorohexane, hexaallylphosphoramide, N,N,N',N'-tetraallylphthalamide, N,N,N',N'-tetraallylmaronamide, trivinylisocyanurate, 2,4,6-trivinylmethyltrisiloxane, tri(5-norbornene-2-methylene)cyanurate and triallylphosphite. Of these, triallyl isocyanurate (TAIL) is preferred from the perspectives of crosslinking properties and the physical properties of a crosslinked article.

It is possible to use a crosslinking accelerator having low self polymerization properties as a crosslinking accelerator used in a peroxide crosslinking system. A crosslinking accelerator having low self polymerization properties means a compound having low self polymerization properties, unlike triallyl isocyanurate (TAIL), which is well-known as a crosslinking accelerator.

Examples of crosslinking accelerators having low self polymerization properties include:

trimethallyl isocyanurate (TMAIC), which is represented by

[Chem. 4]

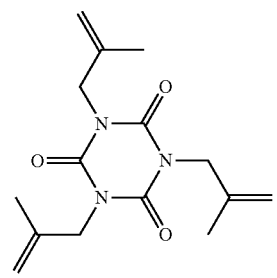

p-quinonedioxime, which is represented by

[Chem. 5]

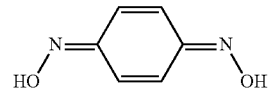

p,p'-dibenzoylquinonedioxime, which is represented by

[Chem. 6]

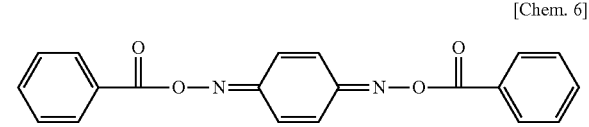

maleimide, which is represented by

[Chem. 7]

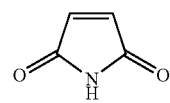

N-phenylene maleimide, which is represented by

[Chem. 8]

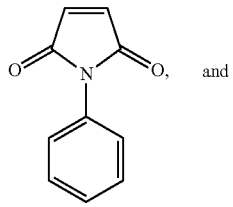

and

N,N'-phenylene bismaleimide, which is represented by

[Chem. 9]

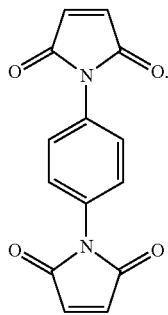

A preferred crosslinking accelerator having low self polymerization properties is trimethallyl isocyanurate (TMAIC).

It is possible to use a bis-olefin as a crosslinking accelerator used in a peroxide crosslinking system.

Examples of bis-olefins able to be used as crosslinking accelerators include bis-olefins represented by the formula:

$R^2R^3C=CR^4—Z—CR^5=CR^6R^7$ (where, $R^2$, $R^3$, $R^4$, $R^5$, $R^6$ and $R^7$ may be the same or different, and each denote H or an alkyl group having 1 to 5 carbon atoms, and Z denotes a linear (straight chain) or branched-chain alkylene or cycloalkylene group having 1 to 18 carbon atoms, which may contain an oxygen atom and which is preferably at least partially fluorinated, or a (per)) fluoropolyoxyalkylene group).

Z is preferably a perfluoroalkylene group having 4 to 12 carbon atoms, and $R^2$, $R^3$, $R^4$, $R^5$, $R^6$ and $R^7$ are preferably hydrogen atoms.

In cases where Z is a (per)fluoropolyoxyalkylene group, a (per) fluoropolyoxyalkylene group represented by the formula:

$-(Q)_p-CF_2O—(CF_2CF_2O)_m—(CF_2O)_n—CF_2-(Q)_p—$ (where, Q is an alkylene or oxyalkylene group having 1 to 10 carbon atoms, p is 0 or 1, and m and n are integers such that m/n is 0.2 to 5 and the molecular weight of the (per)fluoropolyoxyalkylene group is 500 to 10,000, and preferably 1,000 to 4,000) is preferred. In this formula, Q is preferably selected from $—CH_2OCH_2—$ and $—CH_2O(CH_2CH_2O)_sCH_2—$ (s=1 to 3).

Preferred bis-olefins include:

$CH_2=CH—(CF_2)_4—CH=CH_2$ $CH_2=CH—(CF_2)_6—CH=CH_2$, and bis-olefins represented by the formula: $CH_2=CH—Z^1—CH=CH_2$ (where, $Z^1$ is $—CH_2OCH_2—CF_2O—(CF_2CF_2O)_m—(CF_2O)_n—CF_2—CH_2OCH_2—$ (m/n=0.5)).

Of these, 3,3,4,4,5,5,6,6,7,7,8,8-dodecafluoro-1,9-decadiene, which is represented by $CH_2=CH—(CF_2)_6—CH=CH_2$, is preferred.

The blending amount of a peroxide-based crosslinking agent in the first fluororubber composition of the present invention is preferably 0.01 to 10 parts by mass, more preferably 0.1 to 9 parts by mass, and especially preferably 0.2 to 8 parts by mass, relative to 100 parts by mass of the fluororubber (A). If the blending amount of the peroxide-based crosslinking agent is lower than 0.01 parts by mass, crosslinking of the fluororubber (A) tends not to progress sufficiently, and if the blending amount of the peroxide-based crosslinking agent exceeds 10 parts by mass, the balance between physical properties tends to deteriorate.

In addition, the blending amount of the crosslinking accelerator in the first fluororubber composition of the present invention is generally 0.01 to 10 parts by mass, and preferably 0.1 to 9 parts by mass, relative to 100 parts by mass of the fluororubber (A). If the blending amount of the crosslinking accelerator is lower than 0.01 parts by mass, there is a tendency for undercuring to occur, and if the blending amount of the crosslinking accelerator exceeds 10 parts by mass, the balance between physical properties tends to deteriorate.

In the second fluororubber composition of the present invention, the blending amount of the peroxide-based crosslinking agent is preferably 0.01 to 10 parts by mass, more preferably 0.1 to 9 parts by mass, and especially preferably 0.2 to 8 parts by mass, relative to 100 parts by mass of the total amount of the fluororubbers (A1) and (A2). If the blending amount of the peroxide-based crosslinking agent is lower than 0.01 parts by mass, crosslinking of the fluororubbers (A1) and (A2) tends not to progress sufficiently, and if the blending amount of the peroxide-based crosslinking agent exceeds 10 parts by mass, the balance between physical properties tends to deteriorate.

In addition, in the second fluororubber composition of the present invention, the blending amount of the crosslinking accelerator is generally 0.01 to 10 parts by mass, and preferably 0.1 to 9 parts by mass, relative to 100 parts by mass of the total amount of the fluororubbers (A1) and (A2). If the blending amount of the crosslinking accelerator is lower than 0.01 parts by mass, crosslinking of the fluororubbers (A1) and (A2) tends not to progress sufficiently, and if the blending amount of the peroxide-based crosslinking agent exceeds 10 parts by mass, the balance between physical properties tends to deteriorate.

Common rubber components such as fillers, processing aids, plasticizers, colorants, tackifiers, adhesive aids, acid acceptors, pigments, flame retardants, lubricants, photostabilizers, weathering stabilizers, anti-static agents, ultraviolet radiation absorbers, antioxidants, mold release agents, foaming agents, perfumes, oils, softening agents and other polymers such as polyethylene, polypropylene, polyamides, polyesters and polyurethanes can, if necessary, be blended in the first and second fluororubber compositions of the present invention at quantities that do not impair the effect of the present invention.

Examples of fillers include metal oxides such as calcium oxide, titanium oxide, aluminum oxide and magnesium oxide; metal hydroxides such as magnesium hydroxide, aluminum hydroxide and calcium hydroxide; carbonates such as magnesium carbonate, aluminum carbonate, calcium carbonate and barium carbonate; silicates such as magnesium silicate, calcium silicate, sodium silicate and aluminum silicate; sulfates such as aluminum sulfate, calcium sulfate and barium sulfate; synthetic hydrotalcite; metal sulfides such as molybdenum disulfide, iron sulfide and copper sulfide; diatomaceous earth, asbestos, Charlton white (zinc sulfide/barium sulfide), graphite, fluorocarbons, calcium fluoride, coke, fine quartz powder, talc, powdered mica, wollastonite, carbon fibers, aramid fibers, whiskers, glass fibers, organic reinforcing agents, organic fillers, polytetrafluoroethylene, mica, silica, celite and clay. In addition, acid acceptors include calcium oxide, magnesium oxide, lead oxide, zinc oxide, magnesium hydroxide, calcium hydroxide, aluminum hydroxide and hydrotalcite. These may be used in isolation or as a combination of two or more types thereof as appropriate. These may be added at any step in the above-mentioned mixing method, but are preferably added when mixing the fluororubber (A1), the fluororubber (A2), and the carbon black (B) using an internal mixer or an open roll mixer.

Processing aids include higher fatty acids such as stearic acid, oleic acid, palmitic acid and lauric acid; higher fatty acid salts such as sodium stearate and zinc stearate; higher fatty acid amides such as stearic acid amide and oleic acid amide; higher fatty acid esters such as ethyl oleate; petroleum-based waxes such as carnauba wax and ceresin wax; polyglycols such as ethylene glycol, glycerin and diethylene glycol; aliphatic hydrocarbons such as Vaseline and paraffin; silicone-based oils, silicone-based polymers, low molecular weight polyethylene, phthalic acid esters, phosphoric acid esters, rosin, (halogenated) dialkylamines, surfactants, sulfone compounds, fluorine-based additives and organic amine compounds.

Of these, organic amine compounds and acid acceptors are preferred blending components from the perspective of improving the reinforcing properties by being present when the fluororubber (A) and the carbon black (B) or the fluororubber (A1), the fluororubber (A2), and the carbon black (B) are mixed using an internal mixer or an open roll mixer.

Preferred examples of organic amine compounds include primary amines represented by $R^1NH_2$, secondary amines represented by $R^1R^2NH$, and tertiary amines represented by $R^1R^2R^3N$. $R^1$, $R^2$ and $R^3$ may be the same or different, and are each preferably an alkyl group having 1 to 50 carbon atoms, and the alkyl groups may contain a benzene ring as a functional group and may contain a double bond or a conjugated double bond. Moreover, the alkyl groups may be straight chain or branched chain alkyl groups.

Examples of primary amines include coconut amine, octylamine, lauryl amine, stearyl amine, oleyl amine, tallow amine, 17-phenyl-heptadecylamine, octadeca-7,11-dienylamine, octadeca-7,9-dienylamine, octadec-9-enylamine and 7-methyl-octadec-7-enylamine, examples of secondary amines include distearyl amine, and examples of tertiary amines include dimethyloctylamine, dimethyldecylamine, dimethyllaurylamine, dimethylmyristylamine, dimethylpalmitylamine, dimethylstearylamine and dimethylbehenylamine. Of these, amines, and particularly primary amines, having approximately 20 carbon atoms are preferred from the perspectives of ease of procurement and increased reinforcing properties.

In the first fluororubber composition of the present invention, it is preferable to blend 0.01 to 5 parts by mass of the organic amine compound relative to 100 parts by mass of the fluororubber (A). If the blending amount of the organic amine compound is too high, mixing tends to become difficult, and if the blending amount of the organic amine compound is too low, the reinforcing properties tend to deteriorate. A more preferred blending amount is not lower than 0.1 parts by mass relative to 100 parts by mass of the fluororubber (A) from the perspective of reinforcing properties and not higher than 4 parts by mass from the perspectives of reinforcing properties and ease of mixing.

In the second fluororubber composition of the present invention, it is preferable to blend 0.01 to 5 parts by mass of the organic amine compound relative to 100 parts by mass of the total amount of the fluororubbers (A1) and (A2). If the blending amount of the organic amine compound is too high, mixing tends to become difficult, and if the blending amount of the organic amine compound is too low, the reinforcing properties tend to deteriorate. A more preferred blending amount is not lower than 0.1 parts by mass relative to 100 parts by mass of the total amount of the fluororubbers (A1) and (A2) from the perspective of reinforcing properties and not higher than 4 parts by mass from the perspectives of reinforcing properties and ease of mixing.

Of the acid acceptors mentioned above, metal hydroxides such as calcium hydroxide; metal oxides such as magnesium oxide and zinc oxide; and hydrotalcite are preferred from the perspective of reinforcing properties, with zinc oxide being particularly preferred.

In the first fluororubber composition of the present invention, it is preferable to blend 0.01 to 10 parts by mass of the acid acceptor relative to 100 parts by mass of the fluororubber (A). If the blending amount of the acid acceptor is too high, the physical properties tend to deteriorate, and if the blending amount of the acid acceptor is too low, the reinforcing properties tend to deteriorate. A more preferred blending amount is not lower than 0.1 parts by mass relative to 100 parts by mass of the fluororubber (A) from the perspective of reinforcing properties and not higher than 8 parts by mass, and especially not higher than 5 parts by mass, from the perspectives of physical properties and ease of mixing.

In the second fluororubber composition of the present invention, it is preferable to blend 0.01 to 10 parts by mass of the acid acceptor relative to 100 parts by mass of the total amount of the fluororubbers (A1) and (A2). If the blending amount of the acid acceptor is too high, the physical properties tend to deteriorate, and if the blending amount of the acid acceptor is too low, the reinforcing properties tend to deteriorate. A more preferred blending amount is not lower than 0.1 parts by mass relative to 100 parts by mass of the total amount of the fluororubbers (A1) and (A2) from the perspective of reinforcing properties and not higher than 8 parts by mass, and especially not higher than 5 parts by mass, from the perspectives of physical properties and ease of mixing.

In the second fluororubber composition of the present invention, the fluororubber (A1)/the fluororubber (A2) is preferably 95/5 to 50/50 (w/w) because tensile properties and tensile fatigue properties at high temperatures are excellent when the fluororubber (A1)/the fluororubber (A2) is in the range. If the ratio of the fluororubber (A2) is too low, tensile properties at high temperatures tend to be insufficient. If the ratio of the fluororubber (A2) is too high, crosslinking efficiency is reduced, and thereby compression set characteristics may be reduced. The fluororubber (A1)/the fluororubber (A2) is more preferably 90/10 to 55/45 (w/w), and further preferably 80/20 to 60/40.

The first and second fluororubber compositions of the present invention preferably have a difference δG' (G'(1%)-G'(100%)) of not lower than 120 kPa and not higher than 3,000 kPa, where G'(1%) denotes a shear modulus at a dynamic strain of 1%, G'(100%) denotes a shear modulus at a dynamic strain of 100%, and G'(1%) and G'(100%) are determined by a dynamic viscoelasticity test with a rubber process analyzer (RPA) carries out on an unvulcanized rubber in a condition that the measurement frequency is 1 Hz and the measurement temperature is 100° C.

The difference δG' is measured and calculated in a dynamic viscoelasticity test using a rubber process analyzer (RPA), and used as an evaluation parameter for the reinforcing properties of a rubber composition.

A fluororubber composition having a difference δG' of not lower than 120 kPa and not higher than 3,000 kPa is advantageous in terms of resting physical properties, mechanical properties at high temperatures and the like.

The difference δG' is preferably not lower than 150 kPa, more preferably not lower than 160 kPa, further preferably not lower than 300 kPa, even further preferably not lower than 400 kPa, and especially preferably not lower than 500 kPa from the perspective of achieving good resting physical properties, mechanical properties at high temperatures and the like, and is preferably not higher than 2,800 kPa, and more preferably not higher than 2,500 kPa, from the perspective of achieving good resting physical properties, hardness, viscosity when extrusion molded, mechanical properties at high temperatures and the like.

In the following, the method of producing the fluororubber composition of the present invention is described.

The first and second fluororubber compositions of the present invention may be produced using, for example, an internal mixer or an open roll mixer.

Specifically, the production method (1) below is preferably used in terms of obtaining a crosslinked article with further improved mechanical properties at high temperatures. Here, in the case of producing the first fluororubber composition, "fluororubber" in the production methods (1) and (2) denotes the fluororubber (A), and in the case of producing the second fluororubber composition, "fluororubber" denotes the fluororubbers (A1) and (A2).

(1) A method for producing a fluororubber composition, which includes: a step (1-1) of mixing a fluororubber and a carbon black (B) by means of an internal mixer or an open roll mixer until the maximum temperature reaches 80 to 220° C. so as to obtain an intermediate composition; a step (1-2) of cooling the intermediate composition to a temperature of lower than 50° C.; and a step (2-1) of mixing the cooled intermediate composition until the maximum temperature reaches not lower than 10° C. but lower than 80° C. so as to obtain a fluororubber composition.

Step (1-1) is a step of mixing the fluororubber and the carbon black (B) until the maximum temperature reaches 80 to 220° C. so as to obtain an intermediate composition.

Step (1-1) is characterized by mixing the fluororubber and the carbon black (B). By including step (1-1), it is possible to produce a fluororubber composition that can give a crosslinked fluororubber article having particularly favorable tensile properties and tensile fatigue properties at high temperatures.

The mixing in step (1-1) is carried out using an internal mixer or an open roll mixer. The mixing in step (1-1) is preferably carried out using an internal mixer because it enables mixing at high temperatures. Examples of internal mixers include tangential internal mixers such as Banbury mixers, meshing type internal mixers such as intermixers, pressurizing kneader mixers, single screw mixers and twin screw mixers.

When using an internal mixer, the average shear rate of the rotor is preferably 20 to 1000 (1/sec), more preferably 50 to 1000 (1/sec), yet more preferably 100 to 1000 (1/sec), further preferably 200 to 1000 (1/sec), and especially preferably 300 to 1000 (1/sec).

The average shear rate (1/sec) is calculated using the following expression.

Average shear rate $(1/sec) = (\pi \times D \times R)/(60 \ (sec) \times c)$ (in the expression,
D is the diameter of the rotor or the diameter of the roll (cm),
R is the rate of rotation (rpm), and
c is the chip clearance (cm, the size of the gap between the rotor and the casing or between the rolls).)

It is possible to further mix the crosslinking agent (C) and/or the crosslinking accelerator (D) in step (1-1). It is possible to place the fluororubber, the carbon black (B) and the crosslinking agent (C) and/or crosslinking accelerator (D) simultaneously in the internal mixer and then carry out mixing, but it is also possible to mix the fluororubber, crosslinking agent (C) and/or crosslinking accelerator (D) and then mix the carbon black (B).

In addition, it is preferable to further mix an organic amine compound and/or an acid acceptor in step (1-1).

The mixing in step (1-1) is carried out until the maximum temperature of the mixed materials reaches 80 to 220° C. The above-mentioned mixing is preferably carried out until the maximum temperature reaches 120° C. or higher, and more preferably until the maximum temperature reaches 200° C. or lower. The above-mentioned maximum temperature can be determined by measuring the temperature of the mixed materials immediately after being discharged from the mixer.

In the production method (1), step (1-2) is a step in which the intermediate composition obtained in step (1-1) is cooled to a temperature of lower than 50° C. The intermediate composition obtained in step (1-1) has a temperature of 80 to 220° C. By carrying out step (2-1) after a sufficiently cooling the intermediate composition, it is possible to produce a fluororubber composition that gives a crosslinked fluororubber article having excellent mechanical properties at high temperatures. In step (1-2), it is preferable for the cooling to be carried out so that the entire intermediate composition reaches a temperature within the above-mentioned range. The lower limit of the cooling temperature is not particularly limited, but may be 10° C.

In step (1-2), it is preferable to carry out the cooling while mixing the intermediate composition using an open roll mixer.

Step (1-1) and step (1-2) may be repeated any number of times. If step (1-1) and step (1-2) are carried out repeatedly, it is preferable for the intermediate composition to be mixed until the maximum temperature reaches 120 to 220° C., and more preferably mixed until the maximum temperature reaches 120 to 140° C., in step (1-1) and step (1-2). If step (1-1) and step (1-2) are carried out repeatedly, the mixing may be carried out using an internal mixer or an open roll mixer, and is preferably carried out using an internal mixer.

When using an open roll mixer, the average shear rate of the rotor is preferably 20 (1/sec) or higher, more preferably 50 (1/sec) or higher, yet more preferably 100 (1/sec) or higher, further preferably 200 (1/sec) or higher, especially preferably 300 (1/sec) or higher, and preferably 1000 (1/sec) or lower.

In the production method (1), it is preferable to have a step in which the fluororubber and the carbon black (B) are introduced into the internal mixer or open roll mixer, preferably the internal mixer. In the above-mentioned step, the crosslinking agent (C) and/or the crosslinking accelerator (D) may be introduced, and the organic amine compound and/or the acid acceptor may be introduced.

Step (1-1) may include a step in which arbitrary additives are introduced up to the point at which the intermediate composition is discharged. One or more of these additives may be used. These additives may be introduced one or more times. In cases where two or more types of additive are introduced, the additives may be introduced simultaneously or separately. In addition, a single additive may be introduced a plurality of times. The "step in which arbitrary additives are introduced up to the point at which the intermediate composition is discharged" can be, for example, a step in which a carbon black (B') that is different from the carbon black (B) initially introduced in step (1-1) is introduced up to the point at which the intermediate composition is discharged.

In cases where step (1-1) and step (1-2) are repeated also, each of steps (1-1) may include the above-mentioned "step in which arbitrary additives are introduced up to the point at which the intermediate composition is discharged". For example, in a second step (1-1), it is possible to further introduce a carbon black (B') that is different from the carbon black (B) used in the first step (1-1).

In the production method (1), step (2-1) is a step in which a fluororubber composition is obtained by mixing the cooled intermediate composition obtained in step (1-2).

Step (2-1) is a step in which the sufficiently cooled intermediate composition obtained in step (1-2) is further mixed, and is an important step in order to improve the high-temperature mechanical properties of a crosslinked fluororubber article.

It is preferable for the mixing in step (2-1) to be carried out until the maximum temperature of the composition reaches not lower than 10° C. but lower than 80° C. If the maximum temperature of the composition during the mixing becomes too high, there are concerns that it will not be possible to obtain a fluororubber composition able to give a crosslinked fluororubber article having excellent mechanical properties at high temperatures.

Step (2-1) may include a step in which different cooled intermediate compositions obtained in step (1-2) are mixed together. In such cases, the mixing should be carried out until the maximum temperature of the mixture of different intermediate compositions reaches not lower than 10° C. but lower than 80° C.

The production method (1) preferably further includes, after step (2-1), a step (2-2) in which step (2-1) is repeated m−1 times (m is an integer of 2 or higher). By carrying out step (2-1) a total of two or more times, it is possible to stably produce a fluororubber composition that can produce a crosslinked fluororubber article having excellent mechanical properties at high temperatures. The above-mentioned m is preferably an integer of 5 or higher, more preferably an integer of 10 or higher, further preferably an integer of 30 or higher, and particularly preferably an integer of 50 or higher. In each of steps (2-2), it is preferable to include a step in which the intermediate composition is cooled before mixing.

The mixing in step (2-1) and step (2-2) can be carried out using the above-mentioned internal mixer or open roll mixer.

It is preferable for step (2-1) and step (2-2) to be steps in which the intermediate composition is mixed by being introduced into an open roll mixer and then tight milled.

FIG. 1 is a schematic view showing a method for mixing by tight milling. As shown in FIG. 1(a), the intermediate composition is introduced into an open roll 10 provided with a first roll 11 and a second roll 12. The first roll 11 and the second roll 12 rotate at different speeds in the directions indicated by the arrows. The introduced intermediate composition is rolled into a sheet by being passed between the first roll 11 and the second roll 12 while being subjected to a shearing force, as shown in FIG. 1(b), after which the rolled composition is wound at an arbitrary location, as shown in FIG. 1(c).

From the perspective of obtaining a fluororubber composition able to give a crosslinked fluororubber article having excellent mechanical properties at high temperatures, it is preferable for step (2-1) and step (2-2) to be carried out so that the ratio (P/Q), which is obtained by dividing the values (P) of G'(1%)/G' (100%) of the fluororubber composition obtained in step (2-1) and the fluororubber composition obtained in step (2-2) by the value (Q) of G'(1%)/G' (100%) of the intermediate composition obtained in step (1-2) to both be 0.3 to 1.5, more preferably 1.3 or lower, even more preferably 1.0 or lower, particularly preferably lower than 1.0, and especially 0.9 or lower.

The shear modulus at a dynamic strain of 1% (G'(1%)) and the ratio (G'(1%)/G'(100%)) of the shear modulus (G'(1%)) to the shear modulus at a dynamic strain of 100% (G'(100%)) can be calculated from the dynamic viscoelasticity, which is measured using a rubber process analyzer (RPA 2000, manufactured by Alpha Technologies) under conditions of 100° C. and 1 Hz after preheating for 1 minute at 100° C.

It is possible to improve the mechanical properties of a cross linked article at high temperatures even by tight milling just once, but in order to achieve superior mechanical properties at high temperatures, it is preferable to carry out the above-mentioned type milling a total of m times (m is an integer of 2 or higher). The above-mentioned m is preferably an integer of 5 or higher, more preferably an integer of 10 or higher, further preferably an integer of 30 or higher, and particularly preferably an integer of 50 or higher.

It is preferable for the production method (1) to further include a step of mixing the crosslinking agent (C) and/or the crosslinking accelerator (D) with the fluororubber composition obtained in step (2-1) or step (2-2). As mentioned above, it is possible to further mix the crosslinking agent (C) and/or the crosslinking accelerator (D) in step (1-1). In cases where the crosslinking system is a peroxide crosslinking system, it is preferable to mix the crosslinking agent (C) and/or the crosslinking accelerator (D) with the fluororubber composition obtained in step (2-1) or step (2-2) without mixing the crosslinking agent (C) and the crosslinking accelerator (D) in step (1-1).

It is possible to simultaneously mix the crosslinking agent (C) and the crosslinking accelerator (D), but it is also possible to first mix the crosslinking accelerator (D) and then mix the crosslinking agent (C). When mixing is carried out in step (1-1), the mixing conditions for the crosslinking agent (C) and the crosslinking accelerator (D) are the same as the conditions in the above-mentioned step (1-1), except that the maximum temperature during the mixing is not higher than 130° C. Of these, it is preferable to carry out the mixing using an open roll, internal mixer and the like, whereby the average rate of rotation of the rotor is not lower than 20 (1/sec), preferably not lower than 50 (1/sec), more preferably not lower than 100 (1/sec), even more preferably not lower than 200 (1/sec), and particularly preferably not lower than 300 (1/sec). In cases where the crosslinking agent (C) and/or the crosslinking accelerator (D) are mixed with the fluororubber composition obtained in step (2-1) or step (2-2), it is preferable to carry out the mixing so that the maximum temperature is lower than 130° C.

Other than the production method (1), the production method (2) may be used, for example.

(2) A method including introducing a fluororubber, a carbon black (B), and if necessary, an organic amine compound and/or an acid acceptor in predetermined amounts into an internal mixer or an open roll mixer and mixing under the conditions that an average shear rate of the rotor is 20 (1/sec) or higher, preferably 50 (1/sec) or higher, more preferably 100 (1/sec) or higher, further preferably 200 (1/sec) or higher, and especially preferably 300 (1/sec) or higher, and a maximum temperature Tm during mixing is 80 to 220° C. (preferably 120 to 200° C.). The mixing in the production method (2) is preferably carried out using an internal mixer because it enables mixing at high temperatures.

The fluororubber composition obtained by the production method (2) does not contain a crosslinking agent (C) or a crosslinking accelerator (D). Also, the mixing of the production method (2) may be repeatedly carried out. In the case of mixing repeatedly, mixing conditions after the first mixing may be the same as the conditions in the production method (2), except that the maximum temperature Tm during the mixing is not higher than 140° C.

One method for preparing the fluororubber composition of the present invention based on the production method (2) is a method including mixing and mixing the fluororubber composition obtained by carrying out the production method (2) or repeatedly carrying out the production method (2) with a crosslinking agent (C) and/or a crosslinking accelerator (D).

It is possible to simultaneously mix the crosslinking agent (C) and the crosslinking accelerator (D), and it is also possible to first mix the crosslinking accelerator (D) and then mix the crosslinking agent (C). The mixing conditions for the crosslinking agent (C) and the crosslinking accelerator (D) are the same as the conditions in the production method (2), except that the maximum temperature Tm during the mixing is not higher than 130° C.

Another method for preparing the fluororubber composition of the present invention is a method including introducing a fluororubber, a carbon black (B), and a crosslinking agent (C) and/or a crosslinking accelerator (D) in predetermined amounts in proper order into an open roll mixer and mixing under the conditions that an average shear rate of the rotor is 20 (1/sec) or higher, preferably 50 (1/sec) or higher, more preferably 100 (1/sec) or higher, further preferably 200 (1/sec) or higher, and especially preferably 300 (1/sec) or higher, and the maximum temperature Tm during mixing is not higher than 130° C.

The production methods of the present invention preferably include a step of polymerizing a fluorine-containing monomer to produce the fluororubbers (A), (A1), and (A2).

By crosslinking the first or second fluororubber compositions, it is possible to obtain a crosslinked fluororubber article.

The method for crosslinking the fluororubber composition should be selected as appropriate, but can be, for example, a molding method such as extrusion molding or molding by wrapping and steaming or an ordinary crosslinking method such as a crosslinking method that uses a crosslinking jacket and the like. In addition, in cases where secondary crosslinking is required due to the intended use of the crosslinked article, oven crosslinking may be carried out.

In addition, the crosslinked fluororubber article achieves particularly excellent resting physical properties and mechanical properties at high temperatures when the loss elastic modulus (E') is not lower than 400 kPa and not higher than 6,000 kPa in a dynamic viscoelasticity test (measurement mode: tensile, chuck gap: 20 mm, tensile strain: 1%, measurement frequency: 10 Hz, static tension value when the static load conditions are a constant force during strain dispersion: 157 cN, measurement temperature: 160° C.).

The lower limit of the loss elastic modulus is preferably 420 kPa, and more preferably 430 kPa, and the upper limit of the loss elastic modulus is preferably 5,900 kPa, and more preferably 5,800 kPa.

In addition, from the perspective of improving mechanical properties at high temperature, it is preferable for the obtained crosslinked fluororubber article to exhibit a storage elastic modulus (E') of not lower than 1,500 kPa and not higher than 20,000 kPa in a dynamic viscoelasticity test (measurement mode: tensile, chuck gap: 20 mm, measurement temperature: 160° C., tensile strain: 1%, static tension value when the static load conditions are a constant force during strain dispersion: 157 cN, measurement frequency: 10 Hz). The lower limit of the storage elastic modulus is preferably 1,600 kPa, and more preferably 1,800 kPa, and the upper limit of the storage elastic modulus is preferably 19,000 kPa, and more preferably 18,000 kPa.

In addition, in order to be suitable for use in high-temperature environments, it is preferable for the crosslinked fluororubber article to exhibit a tensile elongation at break at 160° C. of 100 to 700%, more preferably not lower than 110%, and even more preferably not lower than 120%, and more preferably not higher than 680%, and even more preferably not higher than 650%.

In addition, in order to be suitable for use in high-temperature environments, it is preferable for the crosslinked fluororubber article to exhibit a tensile strength at break at 160° C. of not lower than 1 MPa, more preferably not lower than 1.5 MPa, and even more preferably not lower than 2 MPa, and preferably not higher than 30 MPa, and more preferably not higher than 28 MPa. The tensile strength at break and tensile elongation at break are measured in accordance with JIS-K 6251 using a No. 6 dumbbell.

In addition, in order to be suitable for use in high-temperature environments, it is preferable for the crosslinked fluororubber article to exhibit a tearing strength at 160° C. of 3 to 30 kN/m, more preferably not lower than 4 kN/m, and even more preferably not lower than 5 kN/m, and more preferably not higher than 29 kN/m, and even more preferably not higher than 28 kN/m.

In addition, in order to be suitable for use in high-temperature environments, it is preferable for the crosslinked fluororubber article to exhibit a tensile elongation at break at 200° C. of 100 to 700%, more preferably not lower than 110%, and even more preferably not lower than 120%, and more preferably not higher than 680%, and even more preferably not higher than 650%.

In addition, in order to be suitable for use in high-temperature environments, it is preferable for the crosslinked fluororubber article to exhibit a tensile strength at break at 200° C. of 1 to 30 MPa, more preferably not lower than 1.5 MPa, and even more preferably not lower than 2 MPa, and preferably not higher than 29 MPa, and more preferably not higher than 28 MPa.

In addition, in order to be suitable for use in high-temperature environments, it is preferable for the crosslinked fluororubber article to exhibit a tearing strength at 200° C. of 3 to 30 kN/m, more preferably not lower than 4 kN/m, and even more preferably not lower than 5 kN/m, and more preferably not higher than 29 kN/m, and even more preferably not higher than 28 kN/m.

The above-mentioned crosslinked fluororubber article can be used in a variety of applications, but can be used particularly advantageously in the various applications mentioned below.

Yet another aspect of the present invention is a fluororubber having an iodine content of 10 to 90 mol % for the total mole of the polymer end groups. The fluororubber composition containing the fluororubber can give a crosslinked article excellent in tensile properties and tensile fatigue properties at high temperatures.

The preferable embodiment of the fluororubber of the present invention is the same as the fluororubber (A) described above.

The fluororubber of the present invention may be produced by, for example, mixing two or more fluororubbers obtained by an iodine transfer polymerization method.

More specifically, the fluororubber of the present invention may be produced by mixing a fluororubber having an iodine atom at both ends of its polymer main chain and a fluororubber having an iodine atom at one end of its polymer main chain.

The fluororubber (A) can be produced by a single polymerization process.

For example, the fluororubber (A) can be produced by a novel production method including polymerization using a monoiodine compound and a diiodine compound as chain transfer agents.

The third fluororubber composition of the present invention is a fluororubber composition containing the fluororubber of the present invention and a carbon black (B). Because of the structure, the third fluororubber composition of the present invention can give a crosslinked article excellent in tensile properties and tensile fatigue properties at high temperatures.

The third fluororubber composition of the present invention may contain the same additives in the same amount as used for the first fluororubber composition of the present invention.

Also, the third fluororubber composition of the present invention can be produced by the same method as used for producing the first fluororubber composition of the present invention.

By crosslinking the third fluororubber composition of the present invention, a crosslinked fluororubber article can be obtained. The crosslinked fluororubber article obtained by crosslinking the third fluororubber composition is excellent in tensile properties and tensile fatigue properties at high temperatures.

The same crosslinking method as used for the first and second fluororubber compositions can be used.

Yet another aspect of the present invention is a fluororubber composition containing a fluororubber (A1), a fluororubber (A2), and a carbon black (B), wherein the fluororubber (A1) is a polymer having an iodine atom at both ends of its main chain and the fluororubber (A2) is a polymer having an iodine atom at only one end of its main chain. Because of the structures, the fourth fluororubber composition of the present invention can give a crosslinked article excellent in tensile properties and tensile fatigue properties at high temperatures.

The fourth fluororubber composition of the present invention may contain the same additives in the same amounts as used for the second fluororubber composition of the present invention.

Also, the fourth fluororubber composition of the present invention can be produced by the same method as used for producing the second fluororubber composition of the present invention.

By crosslinking the fourth fluororubber composition of the present invention, a crosslinked fluororubber article can be obtained. The crosslinked fluororubber article obtained by crosslinking the fourth fluororubber composition is excellent in tensile properties and tensile fatigue properties at high temperatures.

The same crosslinking method as used for the first and second fluororubber compositions can be used.

The above-mentioned fluororubber compositions and crosslinked fluororubber article can be used in a variety of applications, but can be used particularly advantageously in the various applications mentioned below.

(1) Hoses

The hose maybe a hose having a single layer structure comprising only a crosslinked fluororubber article obtained by crosslinking the fluororubber composition of the present invention, but may also be a multilayer hose having a multilayer structure also containing other layers.

Examples of hoses having single layer structures include exhaust gas hoses, EGR hoses, turbocharger hoses, fuel hoses, brake hoses and oil hoses.

Examples of hoses having multilayer structures also include exhaust gas hoses, EGR hoses, turbocharger hoses, fuel hoses, brake hoses and oil hoses.

Turbocharger systems are often installed in diesel engines, and are systems whereby exhaust gas from the engine cause a turbine to rotate, thereby driving a compressor that is linked to the turbine, increasing the compression ratio of the air supplied to the engine and increasing the power output of the engine. This type of turbocharger system, which uses exhaust gas from the engine and achieves a high power output, leads to a reduction in engine size, lower fuel consumption and purification of exhaust gas.

Turbocharger hoses are used in turbocharger systems as hoses for supplying compressed air to the engine. In order to effectively use the space in cramped engine compartments, rubber hoses having excellent flexibility and softness are useful, and it is typical to use hoses having multilayer structures in which a rubber (and especially a fluororubber) layer having excellent thermal ageing resistance and oil resistance is used as an inner layer and a silicone rubber or acrylic rubber is used as an outer layer. However, the space around the engine, such as the engine compartment, is subjected to high temperatures and is a harsh environment in which vibration occurs, meaning that it is essential to use a hose that exhibits not only excellent thermal ageing resistance, but also excellent mechanical properties at high temperatures.

By using a crosslinked fluororubber layer obtained by crosslinking the fluororubber composition of the present invention as a rubber layer in a single layer structure or multilayer structure, it is possible to provide a turbocharger hose which can easily satisfy these required properties and which exhibits excellent properties.

In hoses having multilayer structures other than turbocharger hoses, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from the group consisting of acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from the group consisting of acrylonitrile-butadiene rubbers or hydrogenated products thereof, blended rubbers obtained by blending acrylonitrile-butadiene rubbers and poly(vinyl chloride), fluororubbers and epichlorohydrin rubbers.

In addition, the thermoplastic resin is preferably at least one type of thermoplastic resin selected from the group consisting of fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from the group consisting of fluororesins, polyamide-based resins, poly(vinyl alcohol)-based resins and poly(phenylene sulfide)-based resins.

In addition, when producing a hose having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

A hose including a crosslinked fluororubber layer obtainable by crosslinking the fluororubber composition of the present invention particularly needs to have excellent flexibility at room temperature for easy attachment of the hose on a metallic pipe. If having significant distortion therein, hoses may crack at high temperatures. For hoses, a fluororubber composition providing a cross-linked article that exhibits not only heat resistance, but also excellent tensile properties at high temperatures and tensile resistance properties, such as the fluororubber composition of the present invention, can be suitably used. Such a fluororubber composition can prevent crack generation and crack growth.

The hose of the present invention in which the fluororubber composition includes 5 to 20 parts by mass of the carbon black (B) relative to 100 parts by mass of the fluororubber (A) is excellent in flexibility (low hardness) at room temperature, crack resistance, crack resistance, and crack growth resistance.

The above-mentioned hoses can be advantageously used in fields such as those mentioned below.

The above-mentioned hoses can be used in hoses for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

In the automotive field, the above-mentioned hoses can be used in peripheral equipment for engines and automatic transmissions, and can be used as EGR hoses, exhaust gas hoses, fuel hoses, oil hoses and brake hoses in addition to turbocharger hoses.

In addition, the above-mentioned hoses can also be used in fields such as aviation, rockets, ships, chemical plants, analytical/scientific instruments, food processing plant equipment and atomic power plant equipment.

(2) Sealing Materials

Sealing materials used in oil-drilling device may break by a rapid gas decompression caused by sudden release of the pressure in a deep well. Also, such sealing materials are used at high temperatures or used while exposed to gas such as hydrogen sulfide. In oil or gas industry, high temperature and high pressure are increasingly used. Thereby, a sealing material including a crosslinked fluororubber layer obtainable by crosslinking the fluororubber composition of the present invention particularly needs to have excellent heat resistance and chemical resistance, in addition to rapid gas decompression resistance. The cross-linked article excellent in tensile properties (tensile breaking strength and tensile breaking elongation) at high temperatures and tensile resistance properties has high gas decompression resistance and can prevent damage (e.g. breakage, crack) to the seal. The cross-linked article excellent in tensile properties (tensile breaking strength and tensile breaking elongation) at high temperatures and tensile resistance properties has high gas decompression resistance and can prevent damage (e.g. breakage, crack) to the seal.

The sealing material of the present invention in which the fluororubber composition includes 10 to 60 parts by mass of the carbon black (B) relative to 100 parts by mass of the fluororubber (A) is excellent in heat resistance, chemical resistance, and rapid gas decompression resistance under high temperature and pressure.

When used as a sealing material, the above-mentioned crosslinked fluororubber article can be advantageously used in fields such as those mentioned below.

For example, the above-mentioned crosslinked fluororubber article can be used in sealing materials such as gaskets and contact or non-contact packing materials, which require heat resistance, oil resistance, fuel oil resistance, resistance to anti-freeze used for engine cooling and steam resistance, in engine bodies, main driving systems, valve systems, lubricating/cooling systems, fuel systems, air intake/discharge systems for automotive engines; transmission systems for drive systems; chassis steering systems; braking systems; basic electrical components of electrical equipment, electrical components of control systems, electrical components of accessories and the like (self-sealing packing, piston rings, split ring type packing, mechanical seals, oil seals and the like).

Sealing materials used in engine bodies for automotive engines are not particularly limited, but can be, for example, sealing materials such as cylinder head gaskets, cylinder head cover gaskets, oil pan packing, ordinary gaskets, O-rings, packing and timing belt cover gaskets.

Sealing materials used in main driving systems for automotive engines are not particularly limited, but can be, for example, crankshaft seals or camshaft seals.

Sealing materials used in valve systems for automotive engines are not particularly limited, but can be, for example, valve system oil seals for engine valves and valve seats for butterfly valves.

Sealing materials used in lubricating/cooling systems for automotive engines are not particularly limited, but can be, for example, sealing gaskets for engine oil coolers.

Sealing materials used in fuel systems for automotive engines are not particularly limited, but can be, for example, oil seals for fuel pumps, filler seals for fuel tanks, tank packing and the like, connector O-rings for fuel tubes and the like, injector concussion rings for fuel injection systems, injector seal rings, injector O rings and the like, flange gaskets for carburetors and the like, EGR sealing materials and the like.

Sealing materials used in air intake/discharge systems for automotive engines are not particularly limited, but can be, for example, intake manifold packing, exhaust manifold packing, throttle body packing and turbocharger turbine shaft packing.

Sealing materials used in transmission systems for automotive engines are not particularly limited, but can be, for example, transmission-related bearing seals, oil seals, O-rings and packing and the like, and O-rings and packing for automatic transmission systems.

Sealing materials used in automotive braking systems are not particularly limited, but can be, for example, oil seals, O-rings, packing and the like, piston cups (rubber cups) for master cylinders and the like, caliper seals, boots and the like.

Sealing materials used in automotive electrical components are not particularly limited, but can be, for example, O-rings and packing for vehicle air conditioning systems.

Sealing materials are particularly suitable as sealing materials for sensors (bushes), and especially sealing materials for oxygen sensors, sealing materials for nitrogen oxide sensors, sealing materials for sulfur oxide sensors and the like. O-rings may also be square rings.

Applications in fields other than the automotive field are not particularly limited, and the sealing material can be widely used in fields such as aviation, rockets, ships, oil well drilling (for example, packer seals, MWD seals, LWD seals and the like), chemical plants, pharmaceutical applications, photographic applications such as developers, printing applications such as printing equipment, coating applications such as coating equipment, analytical/scientific instruments, food processing plant equipment, atomic power plant equipment, iron and steel-related applications such as iron plate processing equipment, general industrial applications, electrical applications, fuel cells, electronic components and molding applications such as on-site construction molds.

For example, the sealing material can be oil-resistant, chemical-resistant, heat-resistant, steam-resistance or weathering-resistant packing, O-rings or other sealing materials in transport-related fields such as shipping or aviation; similar packing, O-rings or sealing materials in the field of oil well drilling; similar packing, O-rings or sealing materials in the field of chemical plants; similar packing, O-rings or sealing materials in the fields of food processing plant equipment and food processing equipment (including domestic equipment); similar packing, O-rings or sealing materials in the field of atomic power plant equipment; and similar packing, O-rings or sealing materials in the field of general industrial equipment.

(3) Belts

Under severe conditions such as high temperature condition and chemical (oil) atmosphere, a belt and a belt material including a crosslinked fluororubber layer obtainable by crosslinking the fluororubber composition of the present invention particularly need to have heat resistance and chemical resistance. In addition, since the belts and belt materials are subjected to repeated tensile force and compression force when passing around the pulley, repeated tensile properties and repeated compression properties at high temperatures are also required. Also, some belts are corrugated, or have horizontal crosspieces thereon. Such a complicated shape may cause splitting of the belt when taking out from the mold. For belts and belt materials, a fluororubber composition providing a cross-linked article that exhibits not only heat resistance, but also excellent tensile properties at high temperatures and tensile resistance properties, such as the fluororubber composition of the present invention, can be suitably used.

The belts and belt materials of the present invention in which the fluororubber composition includes 5 to 60 parts by mass of the carbon black (B) relative to 100 parts by mass of the fluororubber (A) is excellent in heat resistance, chemical resistance, and repeated tensile properties and repeated compression properties at high temperatures.

The above-mentioned crosslinked fluororubber article can be advantageously used in belts such as those mentioned below.

It is possible to use the fluororubber composition of the present invention in a belt material for a power transmission belt (including a flat belt, V-belt, V-ribbed belt, toothed belt and the like) or conveyor belt. In addition, the above-mentioned crosslinked fluororubber article can be used in belt materials for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

Examples of flat belts include flat belts used in high-temperature locations, such as around engines in agricultural equipment, machine tools, industrial equipment and the like. Examples of conveyor belts include conveyor belts used to transport loose materials or granular materials, such as coal, crushed stone, sand, mineral ores and wood chips, in high-temperature environments, conveyor belts used in furnaces in ironworks and the like, and conveyor belts used in applications where exposure to high-temperature environments occurs, such as precision instrument assembly plants, food processing plants and the like. Examples of V-belts and V-ribbed belts include V-belts and V-ribbed belts used in agricultural equipment, general equipment (office automation equipment, printing equipment, industrial dryers and the like) and automotive applications. Examples of toothed belts include toothed belts used in drive belts for delivery robots and drive belts for food processing equipment, machine tools and the like, and toothed belts used in automotive applications, office automation equipment, medical applications, printing equipment and the like. In particular, timing belts are examples of automotive toothed belts.

Moreover, in belt materials having multilayer structures, examples of layers comprising other materials include layers comprising other types of rubber, layers comprising thermoplastic resins, fiber reinforcing layers, canvas and metal foil layers.

In cases where chemical resistance and softness are particularly required, the other type of rubber is preferably at least one type of rubber selected from the group consisting of acrylonitrile-butadiene rubbers and hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from the group consisting of acrylonitrile-butadiene rubbers and hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from the group consisting of fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from the group consisting of fluororesins, polyamide-based resins, poly(vinyl alcohol)-based resins and poly(phenylene sulfide)-based resins.

In addition, when producing a belt material having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(4) Rubber Vibration Insulators

By using the above-mentioned crosslinked fluororubber article as a single layer or multilayer rubber layer in a rubber vibration insulator, it is possible to provide an automotive rubber vibration insulator which can easily satisfy the properties required of a rubber vibration insulator and which exhibits excellent properties.

In multilayer rubber vibration insulators other than automotive rubber vibration insulators, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from the group consisting of acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from the group consisting of acrylonitrile-butadiene rubbers and hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from the group consisting of fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from the group consisting of fluororesins, polyamide-based resins, poly(vinyl alcohol)-based resins and poly(phenylene sulfide)-based resins.

In addition, when producing a rubber vibration insulator having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(5) Diaphragms

A diaphragm including a crosslinked fluororubber layer obtainable by crosslinking the fluororubber composition of the present invention particularly needs to have resistance to repeated flex in high-temperature environments. For diaphragms, a fluororubber composition providing a crosslinked article that exhibits not only heat resistance, but also excellent tensile properties at high temperatures and tensile resistance properties, such as the fluororubber composition of the present invention, can be suitably used.

The diaphragm of the present invention in which the fluororubber composition includes 5 to 30 parts by mass of the carbon black (B) relative to 100 parts by mass of the fluororubber (A) is excellent in heat resistance, chemical resistance, and resistance to repeated flex at not only room temperature, but also high temperatures.

The above-mentioned crosslinked fluororubber article can be advantageously used in diaphragms such as those mentioned below.

In automotive engine applications, for example, the above-mentioned crosslinked fluororubber article can be used as a diaphragm for a fuel system, exhaust system, braking system, drive system or ignition system, where heat resistance, oxidation resistance, fuel resistance, low gas permeability and the like are required.

Examples of diaphragms used in automotive engine fuel systems include diaphragms for fuel pumps, diaphragms for carburetors, diaphragms for pressure regulators, diaphragms for pulsation dampers, ORVR diaphragms, diaphragms for canisters and diaphragms for automatic fuel cocks.

Examples of diaphragms used in automotive engine exhaust systems include diaphragms for waste gates, diaphragms for actuators and EGR diaphragms.

Examples of diaphragms used in automotive engine braking systems include diaphragms for air brakes.

Examples of diaphragms used in automotive engine drive systems include oil pressure diaphragms.

Examples of diaphragms used in automotive engine ignition systems include diaphragms for distributors.

Examples of applications other than in automotive engines include diaphragms for ordinary pumps, diaphragms for valves, diaphragms for filter presses, diaphragms for blowers, diaphragms for air conditioning equipment, diaphragms for control equipment, diaphragms for water feed systems, diaphragms used in pumps used to supply hot water, diaphragms for high temperature steam, diaphragms for semiconductor manufacturing (for example, diaphragms for transporting chemicals used in manufacturing processes), diaphragms for food processing equipment, diaphragms for liquid storage tanks, diaphragms for pressure switches, diaphragms used in oil exploration/oil well drilling (for example, diaphragms used to supply lubricating oils for oil well drilling bits and the like), diaphragms for gas appliances such as gas-fired instantaneous water heater and gas meters, diaphragms for accumulators, diaphragms for suspension air springs and the like, diaphragms for naval screw feeders and diaphragms for artificial hearts, for which heat resistance, oil resistance, chemical resistance, steam resistance and low gas permeability are required.

(6) Hollow Rubber Molded Articles

The above-mentioned crosslinked fluororubber article can also be advantageously used in hollow rubber molded articles.

Examples of the above-mentioned hollow rubber molded articles include bladders, molded articles having bellows-like structures and primer bulbs.

(6-1) Bladders

The above-mentioned crosslinked fluororubber article can be advantageously used in a bladder used in a tire vulcanizing process or molding process (a bladder used for tire manufacturing).

In tire manufacturing processes, the types of bladder used are generally divided into two types, namely tire molding bladders, which are used when molding a green tire (unvulcanized tire) after assembling the various constituent components of the tire, and tire vulcanization bladders, which are used in order to impart the shape of the finished tire product during vulcanization.

The above-mentioned crosslinked fluororubber article can be used in both tire molding bladders and tire vulcanization bladders, but is preferably used in tire vulcanization bladders, which are repeatedly used under hot conditions and which require excellent heat resistance and tensile properties at high temperatures.

(6-2) Molded Articles Having Bellows-Like Structures

A bellows-like structure is, for example, a structure having protrusions and/or recesses in the circumferential direction of a cylinder, and the shape of the protrusions and recesses may be a curved wave-like shape or a triangular wave shape.

Specific examples of molded articles having bellows-like structures include joints such as flexible joints and expansion joints, boots and grommets.

Joint members are joints used in pipes and piping equipment, and are used in applications such as preventing vibration and noise emanating from piping systems, absorbing expansion/contraction or displacement caused by fluctuations in temperature or pressure, absorbing dimensional fluctuations and ameliorating and preventing the effects of earthquakes and ground subsidence.

Flexible joints and expansion joints can be advantageously used as molded articles having complex shapes in, for example, piping for shipbuilding, piping for pumps, compressors and the like, piping for chemical plants, electric piping, piping for civil engineering/water and automotive piping.

Boots can be advantageously used as boots used in a variety of industries, for example automotive boots such as constant velocity joint boots, dust covers, rack and pinion steering boots, pin boots and piston boots, boots for agricultural equipment, boots for industrial vehicles, boots for construction equipment, boots for hydraulic equipment, boots for pneumatic equipment, boots for centralized lubrication equipment, boots for transporting liquids, boots for firefighting equipment and boots for transporting a variety of liquefied gases.

(6-3) Primer Bulbs

Figure 2:
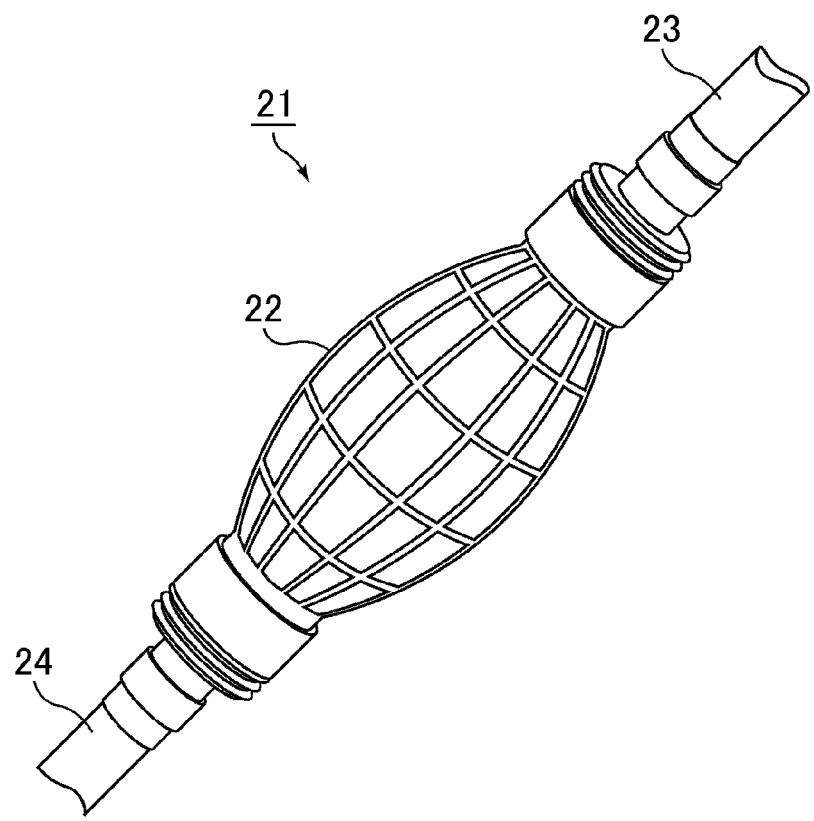
FIG. 2 is a schematic view showing one example of the shape of a primer bulb.

A primer bulb is a pump for supplying fuel to a carburetor (a float chamber in a carburetor) so that an engine can be easily started. A primer bulb has a single protrusion in the circumferential direction of a cylinder, and the shape of the protrusion is a curved wave-like shape. The shape of the primer bulb is, for example, the shape shown in FIG. 2, and the primer bulb 21 is generally disposed between a hose 23 on the discharge side (engine side) and a hose 24 on the intake side (fuel tank side).

Examples of the above-mentioned primer bulb include primer bulbs used in vehicles, ships, aircraft, construction equipment, agricultural equipment and mining equipment. For example, the above-mentioned primer bulb is particularly useful as a naval primer bulb.

(7) Fluororubber Coating Material Compositions

The fluororubber composition obtained by the production method according to the present invention can also be used as a fluororubber coating material composition. A coating film obtained from the above-mentioned fluororubber coating material composition exhibits excellent tensile properties at high temperatures, and therefore tends not break under high-temperature conditions.

The above-mentioned fluororubber coating material composition is preferably one in which the fluororubber composition of the present invention is dissolved or dispersed in a liquid medium.

The above-mentioned fluororubber coating material composition can be prepared by dissolving or dispersing the fluororubber composition, which is obtained by mixing the components that constitute the fluororubber composition by means of, for example, the above-mentioned method, in a liquid medium such as a ketone, ester or ether.

The above-mentioned fluororubber coating material composition may be coated directly on a substrate comprising a metal, glass, resin, rubber and the like, or coated on a substrate after a primer layer is formed on the substrate from an epoxy coating material and the like. Furthermore, another coating film (a top coat layer) may be formed on the coating film obtained from the above-mentioned fluororubber coating material composition.

A coating film obtained from the above-mentioned fluororubber coating material composition can be used in, for example, a sheet or belt; a sealant for a cylindrical member; a pre-coated metal; a packing rubber, O-ring, diaphragm, chemical-resistant tube, chemical stopper, fuel hose, valve seal, chemical plant gasket or engine gasket; a roll (for example, a fixing roll or contact bonding roll) for office automation equipment such as a copier, printer or fax machine, a conveyor belt and the like. The above-mentioned engine gasket can be, for example, a head gasket for an automotive engine and the like.

(8) Wire Coating Materials

The fluororubber composition obtained by the production method according to the present invention can also be advantageously used in an insulating coating material for wires or a sheet material that forms a sheath layer on the outer periphery of an insulating layer of a wire, for which heat resistance and softness (flexibility) are required, and can give a coating film having excellent flexibility at high temperatures.

The above-mentioned insulating coating material or sheath material can be an insulating coating material or sheath material used for heat-resistant wires in automobiles, aircraft, military vehicles and the like, for which heat resistance is particularly required. Of these, the above-mentioned insulating coating material or sheath material is suitable as an insulating coating material or sheet material used in coated wires that are used in environments where the wires come into contact with transmission oil or engine oil of an internal combustion engine or inside automatic transmission systems or engine oil pans of vehicles.

(9) Biodiesel Fuel-Resistant Members (BDF-Resistant Members)

The above-mentioned crosslinked fluororubber article can also be advantageously used in members that come into contact with diesel fuel from biological sources, that is, biodiesel fuels (BDF). Biodiesel fuel includes fuel for diesel engines that is obtained by processing and/or refining a biomass raw material.

In cases where the above-mentioned crosslinked fluororubber article is used in a BDF-resistant member, if the above-mentioned crosslinked fluororubber article contains an acid acceptor, the acid acceptor reacts with the BDF, thereby swelling the crosslinked fluororubber article and raising concerns regarding deterioration, and it is therefore preferable for the above-mentioned crosslinked fluororubber article not to contain an acid acceptor in such cases. In other words, in cases where a crosslinked article obtained from the fluororubber composition of the present invention is used in a BDF-resistant member, it is preferable not to blend an acid acceptor in the fluororubber composition.

The above-mentioned biodiesel fuel-resistant member can be used in a variety of applications where contact with BDF occurs, for example, films, sheets, hoses such as vehicle fuel hoses and oil filler hoses, underground tubes for gasoline stations, bottles such as tanks for vehicle fuel, containers, tanks, automotive seals such as diaphragms, packing, flange gaskets for carburetors and O-rings for fuel pumps, and a variety of mechanical seals such as seals for hydraulic equipment.

Of these, the above-mentioned biodiesel fuel-resistant member is preferably a hose or sealing material, and more preferably a hose.

EXAMPLES

The present invention will now be explained through the use of examples, but the present invention is not limited only to these examples.

The methods for measuring the various physical properties used in the present invention are as follows.

(1) Shear Modulus (G')

A method for measuring the difference δG' (G'(1%)-G'(100%)) between the shear modulus at a dynamic strain of 1% (G'(1%)) and the shear modulus at a dynamic strain of 100% (G'(100%))

The dynamic viscoelasticity is measured using a rubber process analyzer (RPA 2000, manufactured by Alpha Technologies) under conditions of 100° C. and 1 Hz.

(2) Mooney Viscosity ($ML_{1+10}$ (100° C.))

The Mooney viscosity is measured in accordance with JIS K6300. The measurement temperature is 100° C.

(3) the Method for Measuring the Iodine Content for the Total Mole of the Polymer End Groups A polymer (fluororubber, about 250 mg) is dissolved in d6-Acetone (1 mL), and the obtained mixture is subjected to $^1$H-NMR and $^{19}$F-NMR at room temperature.

The NMR device used is VARIAN VNS 400.

The shifts of the peaks are calculated based on a peak derived from d6-Acetone taken as 2.05 ppm.

Polymer end group A: $ICH_2CF_2$— ($^1$H-NMR: 3.8 to 4.0 ppm, 2H, multiplet)

Polymer end group B: $ICF_2CH_2$— ($^{19}$F-NMR: −38 ppm, 2F)

Polymer end group C: $ICF_2CF_2$— ($^{19}$F-NMR: −60 to −61 ppm, 2F)

Polymer end group D: $HCF_2$— ($^1$H-NMR: 6.0 to 6.8 ppm, 1H, multiplet)

Polymer end group E: $CH_3CF_2$— ($^1$H-NMR: 1.78 ppm, 3H, triplet, J=19.2 Hz)

Polymer end group F: $HOCH_2CF_2$— ($^1$H-NMR: 3.77 ppm, 2H, triplet, J=13.4 Hz), Polymer end group G: $(CF_3)_2CF$— ($^{19}$F-NMR: −78 ppm, 6F)

Polymer end group H: $CF_3CF_2$— ($^{19}$F-NMR: −80 ppm, 3F)

If peaks of the polymer end groups are determined as above, the ratio (mol o) of the each polymer end group to the VdF monomer, represented by $\phi_A$, $\phi_B$, $\phi_C$, $\phi_D$, $\phi_E$, $\phi_F$, $\phi_G$, or $\phi_H$, is calculated by the formula:

$$\phi_X (\text{mol \%}) = \frac{S_X/n_X}{S_{VdF}/2} \times 100$$

wherein X represents a polymer end group A, B, C, D, E, F, G, or H; $\phi_X$ is a ratio of the polymer end group X to the VdF monomer; $S_X$ is an integrated value of the peak derived from the polymer end group X; $n_X$ is the number of a hydrogen atom or fluorine atom assigned to the peak of the polymer end group X in $^1$H-NMR or $^{19}$F-NMR; and $S_{VdF}$ is a sum of integrated values of the peak derived from the VdF monomer.

The ratio (mol %) of the polymer end groups containing iodine to all the polymer end groups is calculated by the formula:

$$\text{A ratio of the polymer end groups containing iodine (mol \%)} = \frac{\phi_A + \phi_B + \phi_C}{\phi_A + \phi_B + \phi_C + \phi_D + \phi_E + \phi_F + \phi_G + \phi_H + \phi_Y} \times 100$$

(4) Tensile Fatigue Test

In accordance with JIS-K 6270 and using a No. 6 dumbbell, a repeated tensile strain is applied at a distortion of 60 mm, a frequency of 2 Hz, a temperature of 150° C. and a chuck interval of 50 mm, and the number of cycles until the dumbbell breaks is counted. The measurement is carried out a maximum of 10,000 times.

(5) Tensile Strength at Break and Tensile Elongation at Break

The test equipment used is a "Tensilon" RTG-1310 manufactured by A & D and a "Strograph" TH-200D manufactured by Toyo Seiki Seisaku-sho. The tensile strength at break and tensile elongation at break are measured in accordance with JIS-K 6251, using a No. 6 dumbbell, a chuck gap of 50 mm and a stress rate of 500 mm/min. The measurement temperatures are 25° C. and 160° C.

The following fluororubbers, carbon blacks, crosslinking agent, crosslinking accelerator, processing aids and acid acceptor were used in the examples.

(Carbon Black 1)

ISAF ($N_2SA$=119 $m^2/g$, DBP oil absorption number=114 ml/100 g). "Seast 6" (trade name), manufactured by Tokai Carbon.

(Carbon Black 2)

ISAF ($N_2SA$=79 $m^2/g$, DBP oil absorption number=101 ml/100 g). "Seast 3" (trade name), manufactured by Tokai Carbon.

(Crosslinking Agent)

2,5-dimethyl-2,5-di(t-butylperoxy)hexane. "Perhexa 25B" (trade name), manufactured by NOF Corporation (Crosslinking Accelerator)

Triallyl isocyanurate (TAIL). "TAIL" (trade name), manufactured by Nippon Kasei Chemical Co., Ltd.

(Processing Aids)

Stearyl amine (Farmin 86T) (manufactured by Kao Corporation)

Stearic acid (manufactured by Kanto Kagaku)

(Acid Acceptor)

Zinc oxide (class A) (manufactured by Sakai Chemical Industry Co., Ltd.)

(Fluororubber a1)

44 L of pure water, 8.8 g of a 50% aqueous solution of $CH_2=CFCF_2OCF(CF_2)CF_2OCF(CF_2)COONH_4$ and 176 g of a 50% aqueous solution of $F(CF_2)_5COONH_4$ were placed in an 82 L stainless steel autoclave, which was then thoroughly purged with nitrogen gas. After increasing the temperature to 80° C. while stirring at 230 rpm, monomers were fed so under pressure that the initial monomer composition in the tank was VdF/TFE/HFP=19/11/70 (molar ratio) and the pressure was 1.52 MPa. Next, a polymerization initiator solution obtained by dissolving 1.0 g of ammonium persulfate (APS) in 220 mL of pure water was fed under nitrogen gas pressure, thereby starting a reaction. At the point where the internal pressure dropped to 1.42 MPa due to the polymerization progressing, an additional monomer mixture comprising VdF/TFE/HFP (52/17/31 molar ratio) was fed under pressure as additional monomer mixture until the internal pressure reached 1.52 MPa. At this point, 37 g of the diiodine compound $I(CF_2)_4I$ was fed under pressure. While the pressure was repeatedly increased and decreased, an aqueous solution obtained by dissolving 1.0 g of APS in 220 mL of pure water was fed under nitrogen gas pressure every 3 hours using nitrogen gas, thereby allowing the polymerization reaction to continue. At the point where 14,000 g of the monomer mixture had been added, unreacted monomer was discharged, the autoclave was cooled, and a fluororubber dispersion having a solid content concentration of 22.5% by mass was obtained. The obtained fluororubber has an iodine atom at both of the ends. The copolymer composition of this fluororubber was investigated by means of NMR analysis, and found to have a VdF/TFE/HFP ratio of 51/20/29 (molar ratio) and a Mooney viscosity ($ML_{1+10}$ (100° C.)) of 88. This fluororubber was used as a fluororubber a1.

(Fluororubber a2)

1.7 L of pure water, 0.17 g of a 50% aqueous solution of $CH_2=CFCF_2OCF(CF_2)CF_2OCF(CF_2)COONH_4$ and 6.8 g of a 50% aqueous solution of $F(CF_2)_5COONH_4$ were placed in an 3 L stainless steel autoclave, which was then thoroughly purged with nitrogen gas. After increasing the temperature to 80° C. while stirring at 600 rpm, monomers were fed under pressure so that the initial monomer composition in the tank was VdF/HFP/TFE=47/42/11 (molar ratio) and the pressure was 1.52 MPa. Next, a polymerization initiator solution obtained by dissolving 60 mg of APS in 5 mL of pure water was fed under nitrogen gas pressure, thereby starting a reaction. At the point where the internal pressure dropped to 1.42 MPa due to the polymerization progressing, an additional monomer mixture comprising VdF/HFP/TFE (72/16/12 molar ratio) was fed under pressure as additional monomer mixture until the internal pressure reached 1.52 MPa. At this point, 1.95 g of the diiodine compound $I(CF_2)_4I$ was fed under pressure. While the pressure was repeatedly increased and decreased, an aqueous solution obtained by dissolving 60 mg of APS in 5 mL of pure water was fed under nitrogen gas pressure every 3 hours using nitrogen gas, thereby allowing the polymerization reaction to continue. At the point where 600 g of the monomer mixture had been added, unreacted monomer was discharged, the autoclave was cooled, and 2350 g of a fluororubber dispersion having a solid content concentration of 26.5% by mass was obtained. The polymerization time was 6.4 hours. The copolymer composition of this fluororubber was investigated by means of NMR analysis, and found to have a VdF/HFP/TFE ratio of 72/16/12 (molar ratio) and a Mooney viscosity ($ML_{1+10}$ (100° C.)) of 56. This fluororubber was used as a fluororubber a2.

(Fluororubber a3)

1.7 L of pure water, 0.17 g of a 50% aqueous solution of $CH_2=CFCF_2OCF(CF_3)CF_2OCF(CF_3)COONH_4$ and 6.8 g of a 50% aqueous solution of $F(CF_2)_5COONH_4$ were placed in an 3 L stainless steel autoclave, which was then thoroughly purged with nitrogen gas. After increasing the temperature to 80° C. while stirring at 600 rpm, monomers were fed under pressure so that the initial monomer composition in the tank was VdF/HFP/TFE=59/35/6 (molar ratio) and the pressure was 1.52 MPa. Next, a polymerization initiator solution obtained by dissolving 60 mg of APS in 5 mL of pure water was fed under nitrogen gas pressure, thereby starting a reaction. At the point where the internal pressure dropped to 1.42 MPa due to the polymerization progressing, an additional monomer mixture comprising VdF/HFP/TFE (72/21/7 molar ratio) was fed under pressure as additional monomer mixture until the internal pressure reached 1.52 MPa. At this point, 1.95 g of the diiodine compound I $(CF_2)_4I$ was fed under pressure. While the pressure was repeatedly increased and decreased, an aqueous solution obtained by dissolving 60 mg of APS in 5 mL of pure water was fed under nitrogen gas pressure every 3 hours using nitrogen gas, thereby allowing the polymerization reaction to continue. At the point where 600 g of the monomer mixture had been added, unreacted monomer was discharged, the autoclave was cooled, and 2313 g of a fluororubber dispersion having a solid content concentration of 26.3% by mass was obtained. The polymerization time was 6.5 hours. The copolymer composition of this fluororubber was investigated by means of NMR analysis, and found to have a VdF/HFP/TFE ratio of 72/21/7 (molar ratio) and a Mooney viscosity ($ML_{2+20}$ (100° C.)) of 61. This fluororubber was used as a fluororubber a3.

(Fluororubber a4)

1.7 L of pure water, 0.17 g of a 50% aqueous solution of $CH_2=CFCF_2OCF(CF_2)CF_2OCF(CF_2)COONH_4$ and 6.8 g of a 50% aqueous solution of $F(CF_2)_5COONH_4$ were placed in an 3 L stainless steel autoclave, which was then thoroughly purged with nitrogen gas. After increasing the temperature to 80° C. while stirring at 600 rpm, monomers were fed under pressure so that the initial monomer composition in the tank was VdF/HFP=45/55 (molar ratio) and the pressure was 1.52 MPa. Next, a polymerization initiator solution obtained by dissolving 60 mg of APS in 5 mL of pure water was fed under nitrogen gas pressure, thereby starting a reaction. At the point where the internal pressure dropped to 1.42 MPa due to the polymerization progressing, an additional monomer mixture comprising VdF/HFP (77/23 molar ratio) was fed under pressure as additional monomer mixture until the internal pressure reached 1.52 MPa. At this point, 1.96 g of the diiodine compound $I(CF_2)_4I$ was fed under pressure. While the pressure was repeatedly increased and decreased, an aqueous solution obtained by dissolving 60 mg of APS in 5 mL of pure water was fed under nitrogen gas pressure every 3 hours using nitrogen gas, thereby allowing the polymerization reaction to continue. At the point where 600 g of the monomer mixture had been added, unreacted monomer was discharged, the autoclave was cooled, and 2312 g of a fluororubber dispersion having a solid content concentration of 26.1% by mass was obtained. The polymerization time was 7.3 hours. The copolymer composition of this fluororubber was investigated by means of NMR analysis, and found to have a VdF/HFP ratio of 77/23 (molar ratio) and a Mooney viscosity ($ML_{1+10}$ (100° C.)) of 87. This fluororubber was used as a fluororubber a4.

(Fluororubber a5)

1.7 L of pure water, 0.17 g of a 50% aqueous solution of $CH_2=CFCF_2OCF(CF_2)CF_2OCF(CF_2)COONH_4$ and 6.8 g of a 50% aqueous solution of $F(CF_2)_5COONH_4$ were placed in an 3 L stainless steel autoclave, which was then thoroughly purged with nitrogen gas. After increasing the temperature to 80° C. while stirring at 600 rpm, monomers were fed under pressure so that the initial monomer composition in the tank was VdF/HFP=34/66 (molar ratio) and the pressure was 1.52 MPa. Next, a polymerization initiator solution obtained by dissolving 60 mg of APS in 5 mL of pure water was fed under nitrogen gas pressure, thereby starting a reaction. At the point where the internal pressure dropped to 1.42 MPa due to the polymerization progressing, an additional monomer mixture comprising VdF/HFP (68/32 molar ratio) was fed under pressure as additional monomer until the internal pressure reached 1.52 MPa. At this point, 1.96 g of the diiodine compound $I(CF_2)_4I$ was fed under pressure. While the pressure was repeatedly increased and decreased, an aqueous solution obtained by dissolving 60 mg of APS in 5 mL of pure water was fed under nitrogen gas pressure every 3 hours using nitrogen gas, thereby allowing the polymerization reaction to continue. At the point where 600 g of the monomer mixture had been added, unreacted monomer was discharged, the autoclave was cooled, and 2357 g of a fluororubber dispersion having a solid content concentration of 26.3% by mass was obtained. The polymerization time was 7.9 hours. The copolymer composition of this fluororubber was investigated by means of NMR analysis, and found to have a VdF/HFP ratio of 68/32 (molar ratio) and a Mooney viscosity ($ML_{1+10}$ (100° C.)) of 69. This fluororubber was used as a fluororubber a5.

(Fluororubber b1)

1.7 L of pure water, 0.17 g of a 50% aqueous solution of $CH_2=CFCF_2OCF(CF_2)CF_2OCF(CF_2)COONH_4$ and 6.8 g of a 50% aqueous solution of $F(CF_2)_5COONH_4$ were placed in a 3 L stainless steel autoclave, which was then thoroughly purged with nitrogen gas. After increasing the temperature to 80° C. while stirring at 600 rpm, monomers were fed under pressure so that the initial monomer composition in the tank was VdF/TFE/HFP=19/11/70 (molar ratio) and the pressure was 1.52 MPa. Next, a polymerization initiator solution obtained by dissolving 60 mg of APS in 5 mL of pure water was fed under nitrogen gas pressure, thereby starting a reaction. At the point where the internal pressure dropped to 1.42 MPa due to the polymerization progressing, a monomer mixture comprising VdF/TFE/HFP (52/17/31 molar ratio) was fed under pressure as additional monomer until the internal pressure reached 1.52 MPa. At this point, 0.81 g of the monoiodine compound $(CF_3)_2CFI$ was fed under pressure. While the pressure was repeatedly increased and decreased, an aqueous solution obtained by dissolving 60 mg of APS in 5 mL of pure water was fed under nitrogen gas pressure every 3 hours using nitrogen gas, thereby allowing the polymerization reaction to continue. At the point where 600 g of the monomer mixture had been added, an unreacted monomer was discharged, the autoclave was cooled, and 2322 g of a fluororubber dispersion having a solid content concentration of 26.1% by mass was obtained. The polymerization time was 8.2 hours. The obtained fluororubber had an iodine atom at one end. The copolymer composition of this fluororubber was investigated by means of NMR analysis, and found to have a VdF/TFE/HFP ratio of 51/20/29 (molar ratio) and a Mooney viscosity ($ML_{1+10}$ (100° C.)) of 103. This fluororubber was used as a fluororubber b1.

(Fluororubber b2)

1.7 L of pure water, 0.17 g of a 50% aqueous solution of $CH_2=CFCF_2OCF(CF_3)CF_2OCF(CF_3)COONH_4$ and 6.8 g of a 50% aqueous solution of $F(CF_2)_5COONH_4$ were placed in a 3 L stainless steel autoclave, which was then thoroughly purged with nitrogen gas. After increasing the temperature to 80° C. while stirring at 600 rpm, monomers were fed under pressure so that the initial monomer composition in the tank was VdF/HFP=50/50 (molar ratio) and the pressure was 1.52 MPa. Next, a polymerization initiator solution obtained by dissolving 60 mg of APS in 5 mL of pure water was fed under nitrogen gas pressure, thereby starting a reaction. At the point where the internal pressure dropped to 1.42 MPa due to the polymerization progressing, a monomer mixture comprising VdF/HFP (78/22 molar ratio) was fed under pressure as additional monomer until the internal pressure reached 1.52 MPa. At this point, 2.52 g of the monoiodine compound $(CF_3)_2CFI$ was fed under pressure. While the pressure was repeatedly increased and decreased, an aqueous solution obtained by dissolving 60 mg of APS in 5 mL of pure water was fed under nitrogen gas pressure every 3 hours using nitrogen gas, thereby allowing the polymerization reaction to continue. At the point where 600 g of the monomer mixture had been added, an unreacted monomer was discharged, the autoclave was cooled, and 2355 g of a fluororubber dispersion having a solid content concentration of 26.2% by mass was obtained. The polymerization time was 8.7 hours. The obtained fluororubber had an iodine atom at one end. The copolymer composition of this fluororubber was investigated by means of NMR analysis, and found to have a VdF/HFP ratio of 78/22 (molar ratio) and a Mooney viscosity ($ML_{1+10}$ 100° C.)) of 36. This fluororubber was used as a fluororubber b2.

(Fluororubber b3)

1.7 L of pure water, 0.17 g of a 50% aqueous solution of $CH_2=CFCF_2OCF(CF_3)CF_2OCF(CF_3)COONH_4$ and 6.8 g of a 50% aqueous solution of $F(CF_2)_5COONH_4$ were placed in a 3 L stainless steel autoclave, which was then thoroughly purged with nitrogen gas. After increasing the temperature to 80° C. while stirring at 600 rpm, monomers were fed under pressure so that the initial monomer composition in the tank was VdF/HFP=50/50 (molar ratio) and the pressure was 1.52 MPa. Next, a polymerization initiator solution obtained by dissolving 60 mg of APS in 5 mL of pure water was fed under nitrogen gas pressure, thereby starting a reaction. At the point where the internal pressure dropped to 1.42 MPa due to the polymerization progressing, a monomer mixture comprising VdF/HFP (78/22 molar ratio) was fed under pressure as additional monomer until the internal pressure reached 1.52 MPa. At this point, 1.27 g of the monoiodine compound $(CF_3)_2CFI$ was fed under pressure. While the pressure was repeatedly increased and decreased, an aqueous solution obtained by dissolving 60 mg of APS in 5 mL of pure water was fed under nitrogen gas pressure every 3 hours using nitrogen gas, thereby allowing the polymerization reaction to continue. At the point where 600 g of the monomer mixture had been added, an unreacted monomer was discharged, the autoclave was cooled, and 2332 g of a fluororubber dispersion having a solid content concentration of 26.2% by mass was obtained. The polymerization time was 7.3 hours. The obtained fluororubber had an iodine atom at one end. The copolymer composition of this fluororubber was investigated by means of NMR analysis, and found to have a VdF/HFP ratio of 78/22 (molar ratio) and a Mooney viscosity ($ML_{1+10}$ (100° C.)) of 123. This fluororubber was used as a fluororubber b3.

Example 1

The fluororubber (A1) (70 parts by mass) and the fluororubber (b1) (30 parts by mass) were mixed for 10 minutes using a mixer (MixLabo 0.5 L, Moriyama Company Ltd., rotor diameter: 6.6 cm, tip clearance: 0.05 cm) under the mixing conditions of front rotor speed: 60 rpm and back rotor speed: 50 rpm. The temperature of the mixed product discharged from the mixer was 150° C. The mixed product was cooled to room temperature, and thereby a fluororubber (c1) was obtained. The amount of the iodine for the total amount of the polymer end groups was measured by means of $^1$H-NMR and $^{19}$F-NMR, and was 45 mol %.

Next, 20 parts by mass of the carbon black 1, 0.5 parts by mass of stearyl amine and 1.0 part by mass of zinc oxide were mixed with 100 parts by mass of the fluororubber (c1). The temperature of the mixed product discharged from the mixer was 165° C. This mixed product was again mixed to be cooled to a temperature of 100° C. or lower using an 8 inch open roll mixer adjusted to 25° C., and then discharged. A fluororubber precompound C1 was obtained by ageing the resulting cooled and mixed product at 25° C. for 24 hours. A difference (G'(1%)-G' (100%)) between the shear modulus (G' (1%)) and the shear modulus (G'(100%)) was 731 kPa.

Using an 8 inch open roll mixer (manufactured by Kansai Roll Co., Ltd.), 1.0 part by mass of a crosslinking agent, 0.5 parts by mass of a crosslinking accelerator, and 0.5 parts by mass of stearyl amine were mixed for 15 minutes with 121.5 parts by mass of a fluororubber precompound (C1) at a roll temperature of 25° C., a front roll speed of 21 rpm, a back roll speed of 19 rpm and an inter-roll gap of 0.1 cm, thereby obtaining fluororubber precompounds (D1). The temperature of the mixed products discharged from the open roll mixer was 71° C.

The fluororubber precompounds (D1) was crosslinked by being pressed at 160° C. for 30 minutes, thereby obtaining sheet-like test pieces having thicknesses of 2 mm. Test pieces (JIS No. 6 dumbbells) were prepared from these sheets, and measurement of tensile strength at break and tensile elongation at break at 25° C. and 160° C. and tensile fatigue test were carried out. The results are shown in Table 1.

Reference Example 1

A fluororubber precompound was obtained in the same manner as in Example 1, except that 100 parts by mass of the fluororubber (a1) was used. Physical properties of the fluororubber precompound were measured. The results are shown in Table 1.

Example 2

A fluororubber precompound was obtained in the same manner as in Example 1, except that 80 parts by mass of the fluororubber (a2) and 20 parts by mass of the fluororubber (b2) was used. Physical properties of the fluororubber precompound were measured. The results are shown in Table 1. Moreover, the amount of the iodine for the total amount of the polymer end groups of the mixture of the fluororubber (a2) and the fluororubber (b2), which was obtained in the same manner as in Example 1, was measured by means of $^1$H-NMR and $^{19}$F-NMR, and was 42 mol %.

Example 3

A fluororubber precompound was obtained in the same manner as in Example 1, except that 80 parts by mass of the fluororubber (a3) and 20 parts by mass of the fluororubber (b2) was used. Physical properties of the fluororubber precompound were measured. The results are shown in Table 1. Moreover, the amount of the iodine for the total amount of the polymer end groups of the mixture of the fluororubber (a3) and the fluororubber (b2), which was obtained in the same manner as in Example 1, was measured by means of $^1$H-NMR and $^{19}$F-NMR, and was 40 mol %.

Example 4

A fluororubber precompound was obtained in the same manner as in Example 1, except that 80 parts by mass of the fluororubber (a4) and 20 parts by mass of the fluororubber (b2) was used. Physical properties of the fluororubber precompound were measured. The results are shown in Table 1. Moreover, the amount of the iodine for the total amount of the polymer end groups of the mixture of the fluororubber (a4) and the fluororubber (b2), which was obtained in the same manner as in Example 1, was measured by means of $^1$H-NMR and $^{19}$F-NMR, and was 32 mol %.

Example 5

A fluororubber precompound was obtained in the same manner as in Example 1, except that 80 parts by mass of the fluororubber (a4) and 20 parts by mass of the fluororubber (b2) was used and the carbon black 2 was used instead of the carbon black 1. Physical properties of the fluororubber precompound were measured. The results are shown in Table 1. Moreover, the amount of the iodine for the total amount of the polymer end groups of the mixture of the fluororubber (a4) and the fluororubber (b2), which was obtained in the same manner as in Example 1, was measured by means of $^1$H-NMR and $^{19}$F-NMR, and was 32 mol %.

Example 6

A fluororubber precompound was obtained in the same manner as in Example 1, except that 80 parts by mass of the fluororubber (a4) and 20 parts by mass of the fluororubber (b3) was used. Physical properties of the fluororubber precompound were measured. The results are shown in Table 1. Moreover, the amount of the iodine for the total amount of the polymer end groups of the mixture of the fluororubber (a4) and the fluororubber (b3), which was obtained in the same manner as in Example 1, was measured by means of $^1$H-NMR and $^{19}$F-NMR, and was 34 mol %.

Example 7

A fluororubber precompound was obtained in the same manner as in Example 1, except that 80 parts by mass of the fluororubber (a5) and 20 parts by mass of the fluororubber (b2) was used. Physical properties of the fluororubber precompound were measured. The results are shown in Table 1. Moreover, the amount of the iodine for the total amount of the polymer end groups of the mixture of the fluororubber (a5) and the fluororubber (b2), which was obtained in the same manner as in Example 1, was measured by means of $^1$H-NMR and $^{19}$F-NMR, and was 30 mol %.

TABLE 1

| | Example 1 | Example 2 | Example 3 | Example 4 | Example 5 | Example 6 | Example 7 | Reference Example 1 |
|---|---|---|---|---|---|---|---|---|
| Composition of precompound (part by mass) | | | | | | | | |
| Fluororubber a1 | 70 | | | | | | | 100 |
| Fluororubber a2 | | 80 | | | | | | |
| Fluororubber a3 | | | 80 | | | | | |
| Fluororubber a4 | | | | 80 | 80 | 80 | | |
| Fluororubber a5 | | | | | | | 80 | |
| Fluororubber b1 | 30 | | | | | | | |
| Fluororubber b2 | | 20 | 20 | 20 | 20 | | 20 | |
| Fluororubber b3 | | | | | | 20 | | |
| Carbon black (ISAF) | 20 | 20 | 20 | 20 | | 20 | 20 | 20 |
| Carbon black (HAF) | | | | | 20 | | | |
| Stearyl amine | 0.5 | 0.5 | 0.5 | 0.5 | 0.5 | 0.5 | 0.5 | 0.5 |
| Zinc oxide | 1.0 | 1.0 | 1.0 | 1.0 | 1.0 | 1.0 | 1.0 | 1.0 |
| Maximum temperature of mixed product discharged (° C.) | 167 | 162 | 167 | 163 | 160 | 167 | 157 | 165 |
| Dynamic viscoelasticity test δG' (kPa) | 731 | 703 | 677 | 602 | 455 | 631 | 540 | 680 |
| Composition of full compound (part by mass) | | | | | | | | |
| Precompound | 121.5 | 121.5 | 121.5 | 121.5 | 121.5 | 121.5 | 121.5 | 121.5 |
| TAIC | 0.5 | 0.5 | 0.5 | 0.5 | 0.5 | 0.5 | 0.5 | 0.5 |
| Crosslinking agent | 1.00 | 1.00 | 1.00 | 1.00 | 1.00 | 1.00 | 1.00 | 1.00 |
| Stearyl amine | 0.5 | 0.5 | 0.5 | 0.5 | 0.5 | 0.5 | 0.5 | 0.5 |
| Maximum temperature of mixed product discharged (° C.) | 71 | 68 | 68 | 69 | 70 | 68 | 69 | 71 |
| Conditions of cross-linking by pressing | 160° C., 30 min | 160° C., 30 min | 160° C., 30 min | 160° C., 30 min | 160° C., 30 min | 160° C., 30 min | 160° C., 30 min | 160° C., 30 min |
| Mechanical properties of crosslinked article Measurement temperature 25° C. | | | | | | | | |
| Tensile strength at break (MPa) | 18.1 | 18.5 | 18.7 | 19.5 | 18.7 | 20.7 | 19.8 | 19.2 |
| Tensile elongation at break (%) | 630 | 650 | 660 | 805 | 780 | 840 | 830 | 503 |
| Measurement temperature 160° C. | | | | | | | | |
| Tensile strength at break (MPa) | 3.1 | 3.2 | 3.3 | 4.1 | 3.8 | 4.3 | 3.9 | 3.5 |
| Tensile elongation at break (%) | 420 | 440 | 445 | 500 | 480 | 525 | 540 | 310 |
| Tensile fatigue test (the number of cycle until breaking) | | | | | | | | |
| Test temperature 150° C. | 1422 | 1730 | 2027 | 3230 | 2890 | 4833 | 5320 | 229 |

REFERENCE SIGNS LIST

10: Open roll
11: First roll
12: Second roll
13: Intermediate composition
14: Composition following rolling
21: Primer bulb
22: Convex part
23: Discharge side (engine side) hose
24: Suction side (fuel tank side) hose

The invention claimed is:
1. A fluororubber composition, comprising:
a fluororubber (A1);
a fluororubber (A2); and
a carbon black (B),
wherein the fluororubber (A1) is a polymer having an iodine atom at both ends of its main chain;

the fluororubber (A2) is a polymer having an iodine atom at only one end of its main chain; and a difference (δG'), represented by G'(1%)-G'(100%), is not lower than 120 kPa and not higher than 3,000 kPa, where G'(1%) denotes a shear modulus at a dynamic strain of 1% under uncrosslinked state and G'(100%) denotes a shear modulus at a dynamic strain of 100% under an uncrosslinked state, and G'(1%) and G'(100%) are determined by a dynamic viscoelasticity test with a rubber process analyzer (RPA) in a condition that the measurement frequency is 1 Hz and the measurement temperature is 100° C., wherein the weight ratio of the fluororubber (A1) to the fluororubber (A2) is 95/5 to 50/50 (w/w).

2. The fluororubber composition according to claim 1, wherein the amount of the carbon black (B) is 5 to 65 parts by mass for 100 parts by mass of the total amount of the fluororubber (A1) and the fluororubber (A2).

3. The fluororubber composition according to claim 1, wherein the carbon black (B) has a nitrogen adsorption specific surface area ($N_2SA$) of 25 to 180 $m^2/g$ and a dibutyl phthalate (DBP) oil absorption number of 40 to 180 mL/100 g.

4. The fluororubber composition according to claim 1, further comprising a crosslinking agent (C).

5. A crosslinked fluororubber article obtained by crosslinking the fluororubber composition according to claim 1.

6. The crosslinked fluororubber article according to claim 5,
wherein the crosslinked fluororubber article is used for bladders for tire manufacturing.

7. A hose including a crosslinked fluororubber layer obtainable by crosslinking the fluororubber composition according to claim 1.

8. A sealing material including a crosslinked fluororubber layer obtainable by crosslinking the fluororubber composition according to claim 1.

9. A diaphragm including a crosslinked fluororubber layer obtainable by crosslinking the fluororubber composition according to claim 1.

10. A belt and a belt material including a crosslinked fluororubber layer obtainable by crosslinking the fluororubber composition according to claim 1.

11. A fluororubber composition, comprising:
a fluororubber (A1);
a fluororubber (A2); and
a carbon black (B),
wherein the fluororubber (A1) is a polymer having an iodine atom at both ends of its main chain; and
the fluororubber (A2) is a polymer having an iodine atom at only one end of its main chain,
wherein the weight ratio of the fluororubber (A1) to the fluororubber (A2) is 95/5 to 50/50 (w/w).

* * * * *